US009413572B2

(12) United States Patent
Bogoni

(10) Patent No.: US 9,413,572 B2
(45) Date of Patent: Aug. 9, 2016

(54) METHOD OF CONVERTING AN OPTICAL COMMUNICATIONS SIGNAL AND AN OPTICAL RECEIVER

(75) Inventor: Antonella Bogoni, Mantova (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 131 days.

(21) Appl. No.: 14/361,665

(22) PCT Filed: Nov. 29, 2011

(86) PCT No.: PCT/EP2011/071254
§ 371 (c)(1),
(2), (4) Date: Aug. 13, 2014

(87) PCT Pub. No.: WO2013/079094
PCT Pub. Date: Jun. 6, 2013

(65) Prior Publication Data
US 2014/0348514 A1 Nov. 27, 2014

(51) Int. Cl.
H04B 10/00 (2013.01)
H04B 10/04 (2006.01)
H04L 25/49 (2006.01)
H04B 10/67 (2013.01)
H04L 27/20 (2006.01)
H04L 27/34 (2006.01)
(Continued)

(52) U.S. Cl.
CPC .......... *H04L 25/4917* (2013.01); *H04B 10/516* (2013.01); *H04B 10/677* (2013.01); *H04L 25/4906* (2013.01); *H04L 27/2071* (2013.01); *H04L 27/2078* (2013.01); *H04L 27/3477* (2013.01); *H04L 27/3845* (2013.01)

(58) Field of Classification Search
CPC .... H04B 10/677; H04B 10/06; H04B 10/541; H04B 10/00
USPC ................... 398/183, 176, 173, 188
See application file for complete search history.

(56) References Cited

U.S. PATENT DOCUMENTS

2006/0072924 A1\* 4/2006 Lee .................... H04B 10/2513
398/183
2007/0127933 A1\* 6/2007 Hoshida ................. H04B 10/66
398/202
2008/0166126 A1\* 7/2008 Ohm .................... H04B 10/677
398/79

(Continued)

OTHER PUBLICATIONS

Guoxiu Huang, All optical OOk to 16QAM Modulation format conversion employing Nonlinear Optical Fiber Loop Mirror, OSA Publishing, Mar. 2011.\*

(Continued)

*Primary Examiner* — David Payne
*Assistant Examiner* — Pranesh Barua
(74) *Attorney, Agent, or Firm* — Nicholson De Vos Webster & Elliott LLP

(57) ABSTRACT

A method of converting an optical communications signal having a differentially encoded multilevel modulation format into communications traffic bits, the multilevel modulation format having a plurality of constellation points, the method comprising: receiving a consecutive pair of symbol signals of said optical communications signal, the pair of symbol signals being arranged to differentially encode a plurality of communications traffic bits; and generating a plurality of optical binary signals in dependence on the symbol signals, each optical binary signal having a respective binary signal level, wherein the optical binary signals form optical versions of the encoded communications traffic bits.

12 Claims, 19 Drawing Sheets

(51) Int. Cl.
*H04L 27/38* (2006.01)
*H04B 10/516* (2013.01)

(56) References Cited

U.S. PATENT DOCUMENTS

| | | | | |
|---|---|---|---|---|
| 2009/0059351 | A1* | 3/2009 | Xu | H04B 10/677 359/325 |
| 2010/0040383 | A1 | 2/2010 | Hironishi et al. | |
| 2011/0181943 | A1* | 7/2011 | Murai | H04B 10/299 359/337.2 |
| 2011/0206383 | A1* | 8/2011 | Chien | H04B 10/25759 398/187 |
| 2011/0318014 | A1* | 12/2011 | Von Lerber | H04B 10/677 398/115 |
| 2012/0224806 | A1* | 9/2012 | Lu | G01N 21/45 385/28 |
| 2014/0133870 | A1* | 5/2014 | Lee | H04B 10/541 398/186 |
| 2014/0301741 | A1* | 10/2014 | Christensen | H04B 10/695 398/141 |

OTHER PUBLICATIONS

PCT International Search Report for PCT Counterpart Application No. PCT/EP2011/071254, (Oct. 15, 2012), 3 pages.

Mori, et al., "Unrepeated 200-km transmission of 40-Gbit/s 16-QAM signals using digital coherent optical receiver", *Opto-Electronics and Communications Conference, 2008 and the 2008 Australian Conference on Optical Fibre Technology*. OECC/ACOFT 2008, (Jul. 7-10, 2008), 2 pages.

\* cited by examiner

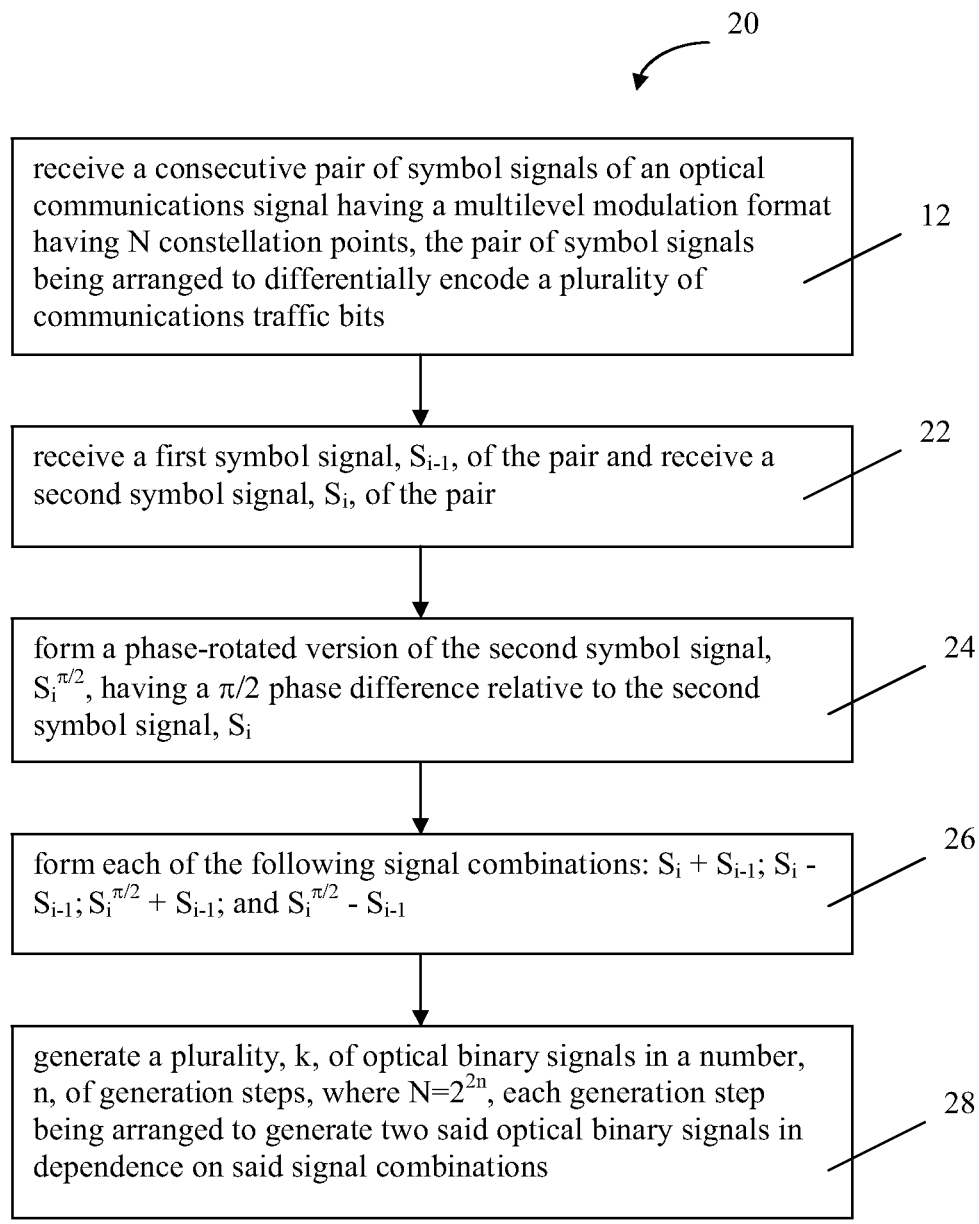

```
20 ─╮
    ▼

┌─────────────────────────────────────────────────────────┐
│ receive a consecutive pair of symbol signals of an optical │
│ communications signal having a multilevel modulation format│── 12
│ having N constellation points, the pair of symbol signals  │
│ being arranged to differentially encode a plurality of     │
│ communications traffic bits                                │
└─────────────────────────────────────────────────────────┘
``` receive a consecutive pair of symbol signals of an optical communications signal having a multilevel modulation format having N constellation points, the pair of symbol signals being arranged to differentially encode a plurality of communications traffic bits — 12 receive a first symbol signal, $S_{i-1}$, of the pair and receive a second symbol signal, $S_i$, of the pair — 22 form a phase-rotated version of the second symbol signal, $S_i^{\pi/2}$, having a $\pi/2$ phase difference relative to the second symbol signal, $S_i$ — 24 form each of the following signal combinations: $S_i + S_{i-1}$; $S_i - S_{i-1}$; $S_i^{\pi/2} + S_{i-1}$; and $S_i^{\pi/2} - S_{i-1}$ — 26 generate a plurality, k, of optical binary signals in a number, n, of generation steps, where $N=2^{2n}$, each generation step being arranged to generate two said optical binary signals in dependence on said signal combinations — 28

Fig. 2

|  | Case | C1 | C2 | C3 | C4 |
|---|---|---|---|---|---|
| P11→P1 ,..., P11→P16 | 1 | true | false | false | true |
| | 2 | true | false | true | true |
| | 3 | false | false | true | true |
| | 4 | false | false | false | true |
| | 5 | true | false | true | false |
| | 6 | true | false | false | false |
| | 7 | false | false | false | false |
| | 8 | false | false | true | false |
| | 9 | true | true | true | true |
| | 10 | true | true | false | false |
| | 11 | false | true | false | false |
| | 12 | false | true | true | true |
| | 13 | true | true | false | true |
| | 14 | true | true | true | false |
| | 15 | false | true | true | false |
| | 16 | false | true | false | true |
| P12→P1 ,..., P12→P16 | 17 | true | false | true | true |
| | 18 | false | false | true | true |
| | 19 | false | false | false | false |
| | 20 | false | false | true | false |
| | 21 | true | false | false | false |
| | 22 | true | false | false | true |
| | 23 | false | false | false | true |
| | 24 | false | true | true | true |
| | 25 | true | false | true | false |
| | 26 | true | true | false | true |
| | 27 | false | true | false | true |
| | 28 | false | true | false | false |
| | 29 | true | true | true | true |
| | 30 | true | true | false | false |
| | 31 | true | true | true | false |
| | 32 | false | true | true | false |
| P15→P1 ,..., P15→P16 | 33 | true | false | true | false |
| | 34 | true | false | false | false |
| | 35 | true | false | true | true |
| | 36 | false | false | true | true |
| | 37 | true | true | true | true |
| | 38 | true | false | false | true |
| | 39 | false | false | false | true |
| | 40 | false | false | false | false |
| | 41 | true | true | false | false |
| | 42 | true | true | false | true |
| | 43 | false | true | false | true |
| | 44 | false | false | true | false |
| | 45 | true | true | true | false |
| | 46 | false | true | true | false |
| | 47 | false | true | false | false |
| | 48 | false | true | true | true |
| P16→P1 ,..., P16→P16 | 49 | true | false | false | false |
| | 50 | true | false | true | true |
| | 51 | false | false | true | true |
| | 52 | false | false | false | false |
| | 53 | true | false | true | false |
| | 54 | true | false | false | true |
| | 55 | false | false | false | true |
| | 56 | false | false | true | false |
| | 57 | true | true | true | true |
| | 58 | true | true | false | true |
| | 59 | false | true | false | true |
| | 60 | false | true | true | true |
| | 61 | true | true | false | false |
| | 62 | true | true | true | false |
| | 63 | false | true | true | false |
| | 64 | false | true | false | false |

Fig. 10

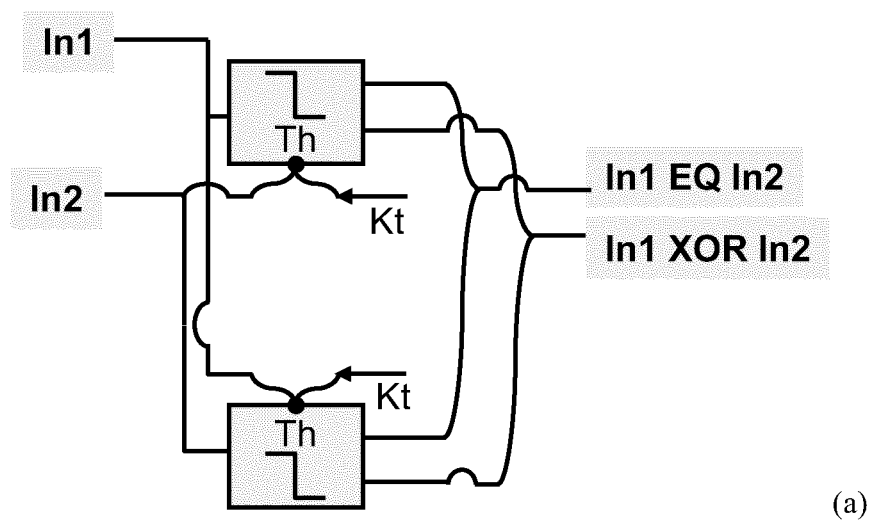
(a)
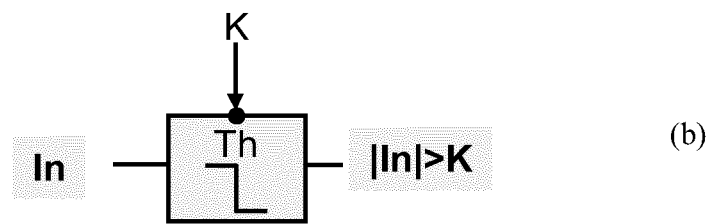
(b)
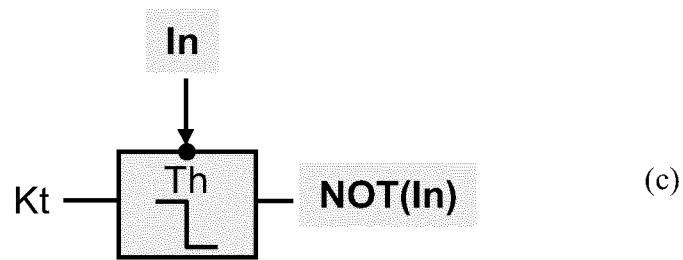
(c)
Fig. 18

US 9,413,572 B2

METHOD OF CONVERTING AN OPTICAL COMMUNICATIONS SIGNAL AND AN OPTICAL RECEIVER

CROSS-REFERENCE TO RELATED APPLICATIONS

This application is a National stage of International Application No. PCT/EP2011/071254, filed Nov. 29, 2011, which is hereby incorporated by reference.

TECHNICAL FIELD

The invention relates to a method of converting an optical communications signal having a differentially encoded multilevel modulation format into communications traffic bits, the multilevel modulation format having a plurality, N, of constellation points. The invention further relates to an optical receiver and to an optical regenerator comprising the optical receiver.

BACKGROUND

The use of multi-level modulation formats is one of the most effective ways of enhancing spectral efficiency in optical communication systems and provides a cost-effective method of increasing the transmission capacity. Many modulation formats are known for generating multilevel optical signals, including quadrature amplitude modulation (QAM), where both of the in-phase and quadrature components are modulated in a multi-level manner. Differential modulation formats, such as differential quaternary phase-shift-keying (DQPSK) that allows the transmission of 2 bits/symbol, are also appealing as they provide higher robustness against fiber nonlinearities. Polarization multiplexing can also be used to increase the total capacity of an optical communications system link.

Depending on the modulation format which is used, different techniques are required to receive the transmitted bits. Currently, a transmitted optical signal needs to be converted into the electrical domain in order to extract and process the transmitted communications traffic. Where the modulation format of the transmitted optical signal includes a phase modulation the most common method of converting the optical signal into the electrical domain using digital coherent optical receivers, such as reported by Y. Mori et al, "Unrepeated 200-km transmission of 40-Gbit/s 16-QAM signals using digital coherent optical receiver", OECC/ACOFT 2008, Sidney 7-10 Jul. 2008. While there are commercially available solutions able to process signals in the electrical domain at up to 50 GHz, electronic approaches become increasingly complex and expensive as the frequency gets higher.

SUMMARY

It is an object to provide an improved method of converting an optical communications signal having a differentially encoded multilevel modulation format into communications traffic bits. It is a further object to provide an improved optical receiver. It is a further object to provide an improved optical regenerator.

A first aspect of the invention provides a method of converting an optical communications signal having a differentially encoded multilevel modulation format into communications traffic bits. The multilevel modulation format has a plurality, N, of constellation points. The method comprises step a. of receiving a consecutive pair of symbol signals of said optical communications signal. The pair of symbol signals have been arranged to differentially encode a plurality of communications traffic bits. The method further comprises step b. of generating a plurality, $k=\log_2 N$, of optical binary signals in dependence on the symbol signals. Each optical binary signal has a respective binary signal level. The optical binary signals form optical versions of the encoded communications traffic bits.

The may enable symbol decisions to be made in the optical domain on a differentially encoded multilevel modulated optical communications signal. The method may overcome the frequency bandwidth limitations of electronic devices which are experienced when processing communications signals in the electrical domain. The method may optically regenerate the traffic bits carried by an optical communications signal. The method may be implemented in an optical communications network to optically make symbol decisions and to regenerate communications traffic bits, which may reduce the network complexity and enable the use of complex routing architectures. In an embodiment, each optical binary signal is an on-off keying, OOK, modulated optical signal. The method may be used to transform a received multilevel modulated signal into OOK signals suitable for further processing in the optical domain.

In an embodiment, the multilevel modulation format is a quadrature amplitude modulation, QAM, modulation format.

In an embodiment, step b. comprises a step i. of receiving a first symbol signal, $S_{i-1}$, of the pair and receiving a second symbol signal, $S_i$, of the pair. Step b. further comprises a step ii. of forming a phase-rotated version of the second symbol signal, $S_i^{\pi/2}$, having a $\pi/2$ phase difference relative to the second symbol signal, $S_i$. Step b. further comprises a step iii. of forming each of the following signal combinations: $S_i+S_{i-1}$; $S_i-S_{i-1}$; $S_i^{\pi/2}+S_{i-1}$; and $S_i^{\pi/2}-S_{i-1}$. Step b. further comprises a step iv. of generating a plurality, k, of optical binary signals in a number, n, of generation steps, where $N=2^{2n}$. Each generation step is arranged to generate two said optical binary signals in dependence on said signal combinations. The optical binary signals are generated in dependence on a small number of optical signals which are obtained by simple processing of two consecutive symbol signals. The optical binary signals may uniquely identify the symbol encoded between the two symbol signals. Use of a number of generation steps enables the method to have a simple, modular construction, which may allow easy upgrading of the method to have an increased number of generation steps and therefore be used to process higher order N-QAM modulated signals.

In an embodiment, step iv. comprises a first said generation step comprising a step A. of determining whether it is true or false that an amplitude of a first one of the signal combinations is greater than an amplitude of a second one of the signal combinations. In step A. a first said optical binary signal having a binary signal level of one is generated if it is true and a binary signal level of zero is generated if it is false. The first generation step further comprises a step B. of determining whether it is true or false that an amplitude of a third one of the signal combinations is greater than an amplitude of a fourth one of the signal combinations. In step B. a second said optical binary signal having a binary signal level of one is generated if it is true and a binary signal level of zero is generated if it is false. The optical binary signals are therefore generated with their signal levels depending on comparisons of the amplitudes of pairs of signal combinations which are obtained by simple processing of two consecutive symbol signals. The optical binary signals uniquely identify the symbol encoded between the two symbol signals, the symbol being a phase change. The method may be used to perform symbol decisions on a 4-QAM optical communications signal. The method may be used to optically convert a 4-QAM optical communications signal into optical communications traffic bits.

In an embodiment, step A. is one of: is it true or false that $|S_i+S_{i-1}|>|S_i^{\pi/2}+S_{i-1}|$; is it true or false that $|S_i-S_{i-1}|>|S_i^{\pi/2}-S_{i-1}|$; is it true or false that $|S_i^{\pi/2}+S_{i-1}|>|S_i+S_{i-1}|$; and it true or false that $|S_i^{\pi/2}-S_{i-1}|>|S_i-S_{i-1}|$. Step B. is one of: is it true or false that $|S_i+S_{i-1}|>|S_i^{\pi/2}-S_{i-1}|$; is it true or false that $|S_i-S_{i-1}|>|S_i^{\pi/2}+S_{i-1}|$; is it true or false that $|S_i^{\pi/2}+S_{i-1}|>|S_i-S_{i-1}|$; and it true or false that $|S_i^{\pi/2}-S_{i-1}|>|S_i+S_{i-1}|$. Each step may be implemented using one of several comparisons between the signal combinations.

In an embodiment, step A. is: is it true or false that $|S_i^{\pi/2}+S_{i-1}|>|S_i+S_{i-1}|$; and step B. is: is it true or false that $|S_i+S_{i-1}|>|S_i^{\pi/2}-S_{i-1}|$.

In an embodiment, step A is: it true or false that $|S_i^{\pi/2}-S_{i-1}|>|S_i-S_{i-1}|$; and step B. is: is it true or false that $|S_i-S_{i-1}|>|S_i^{\pi/2}+S_{i-1}|$.

In an embodiment, the multilevel modulation format is 4-QAM.

In an embodiment, step iv. further comprises at least one subsequent said generation step. Each subsequent generation step comprises a first logic operation comprising determining whether it is true or false that an amplitude of one of the signal combinations is greater than one of a threshold value and a combination an amplitude of another one of the signal combinations and a threshold value. The first logic operation further comprises generating a first subsequent optical binary signal having a binary signal level of one if it is true and a binary signal level of zero if it is false. Each subsequent generation step further comprises a second logic operation comprising determining whether it is true or false that an amplitude of one of the signal combinations is greater than one of a further threshold value and a combination an amplitude of another one of the signal combinations and a further threshold value. The second logic operation further comprises generating a second subsequent optical binary signal having a binary signal level of one if it is true and a binary signal level of zero if it is false.

Building the method from a number of generation steps enables the method to have a simple, modular construction, which may allow easy upgrading of the method to have an increased number of generation steps and therefore be able to process higher order N-QAM modulated signals.

The optical binary signals uniquely identify the symbol encoded between the two symbol signals, the symbol representing both a phase change and an amplitude change. The method may be used to perform symbol decisions on a 16-QAM optical communications signal. The method may be used to optically convert a 16-QAM optical communications signal into optical communications traffic bits.

In an embodiment, the first logic operation comprises determining whether it is true or false that $\{|S_i-S_{i-1}|>|S_i+S_{i-1}|+$a first threshold value, Th0$\}$ or $\{|S_i+S_{i-1}|>|S_i-S_{i-1}|+$Th1$\}$ or $\{|Si^{\pi/2}+Si-1|>|Si^{\pi/2}-Si-1|+$a second threshold value, Th2$\}$ or $\{|Si^{\pi/2}-S_{i-1}|>|S_i^{\pi/2}+S_{i-1}|+$Th2$\}$. A third said optical binary signal having a binary signal level of one is generated if true and a binary signal level of zero is generated if false. The second logic operation comprises determining whether it is true or false that $\{|S_i+S_{i-1}|>$a third threshold value, Th3$\}$ or $\{|S_i-S_{i-1}|>$a fourth threshold value, Th4$\}$ or $\{|S_i^{\pi/2}+S_{i-1}|>$a fifth threshold value, Th5$\}$ or $\{|S_i^{\pi/2}+S_{i-1}|>$a sixth threshold value, Th6$\}$ or $\{|S_i-S_{i-1}|>|S_i+S_{i-1}|+$a seventh threshold value, Th7$\}$ or $\{|S_i^{\pi/2}-S_{i-1}|>\{|S_i^{\pi/2}+S_{i-1}|+$an eighth threshold value, Th8$\}$. A fourth said optical binary signal having a binary signal level of one is generated if true and a binary signal level of zero is generated if false. Th1=K1+A+B, Th2=K1+A+C, Th3=K2+C+C2+C3, Th4=K2+C+NOT(C2)+C3, Th5=K2+B+C2+C3, Th6=K2+B+NOT(C2)+C3, Th7=B+NOT(C3) and Th8=C+NOT(C3). A is one if $|S_{i-1}|>K3$ and is zero otherwise. B is one if C1 or C2 but not both are one and is zero otherwise. C is one if C1 equals C2 and is zero otherwise, where C1 is the binary level of the first optical binary signal, C2 is the binary level of the second optical binary signal and K1, K2 and K3 are constants.

In an embodiment, K1 is the minimum value of $|S_i-S_{i-1}|+|S_i+S_{i-1}|/2$, K2 is the average of the two lowest values of $|S_i-S_{i-1}|$ and K3=$(|P_{11}|+|P_{16}|)/2$, where $|P_{11}|$ is the amplitude of a first point having $\pi/2$ phase in the first quadrant of a 16-QAM constellation diagram and $|P_{16}|$ is the amplitude of a second point having $\pi/2$ phase in the first quadrant of said 16-QAM constellation diagram.

In an embodiment, step iv. comprises one subsequent generation step and the multilevel modulation format comprises 16-QAM.

In an embodiment, step iv. comprises n generation steps and the multilevel modulation format comprises N-QAM.

In an embodiment, the method further comprises step c. of obtaining a phase change between the symbol signals in dependence on the optical binary signal levels.

In an embodiment, the phase change is obtained by comparing the optical binary signal levels with pre-stored sets of optical binary signal levels and determining which set the optical binary signal levels matches. Each pre-stored set corresponds to a unique phase change. The phase change of the matching set is retrieved.

A second aspect of the invention provides an optical receiver comprising an input and an optical circuit. The input is arranged to receive an optical communications signal having a differentially encoded multilevel modulation format having a plurality, N, of constellation points. The optical circuit is arranged to receive a consecutive pair of symbol signals of said optical communications signal, the pair of symbol signals differentially encoding a plurality of communications traffic bits. The optical circuit is arranged to generate a plurality, $k=\log_2 N$, of optical binary signals in dependence on the symbol signals, each optical binary signal having a respective binary signal level. The optical binary signals form optical versions of the encoded communications traffic bits.

The optical receiver is able to make symbol decisions in the optical domain on a differentially encoded multilevel modulated optical communications signal. The optical receiver may therefore overcome the frequency bandwidth limitations of electronic devices which are experienced when processing communications signals in the electrical domain. The optical receiver is able to optically regenerate the traffic bits carried by the optical communications signal. The optical receiver may be used in an optical communications network to optically make symbol decisions and to regenerate communications traffic bits, which may reduce the network complexity and enable the use of complex routing architectures.

In an embodiment, each optical binary signal is an on-off keying, OOK, modulated optical signal. The optical receiver is thus able to transform a received multilevel modulated signal into OOK signals suitable for further processing in the optical domain.

In an embodiment, the multilevel modulation format is a quadrature amplitude modulation, QAM, modulation format.

In an embodiment, the optical circuit comprises an optical splitter, first, second and third optical paths, first and second signal combiners and optical binary signal generation apparatus. The optical splitter is arranged to receive each symbol signal and to power split each symbol signal into a first part, a second part and a third part. The first optical path is arranged to transmit the first part to form an unmodified symbol signal, $S_i$. The second optical path is arranged to apply a time delay to the second part, the time delay being the symbol time of the optical communications signal, to form a delayed symbol signal, $S_{i-1}$. The second optical path is arranged to power split the delayed symbol signal into a first part and a second part. The third optical path is arranged to apply a $\pi/2$ phase shift to the third part to form a phase rotated symbol signal, $S_i^{\pi/2}$. The first signal combiner is arranged to receive the unmodified symbol signal and a first part of the delayed symbol signal, and is arranged to form the signal combinations $S_i+S_{i-1}$ and $S_i-S_{i-1}$. The second signal combiner is arranged to receive the second part of the delayed symbol signal and the phase rotated symbol signal, and is arranged to form the signal combinations $S_i^{\pi/2}+S_{i-1}$ and $S_i^{\pi/2}-S_{i-1}$. The optical binary signal generation apparatus comprises a number, n, of generation stages, where $N=2^{2n}$. Each generation stage is arranged to generate two said optical binary signals in dependence on said signal combinations. The optical binary signals are generated in dependence on a small number of optical signals which are obtained by simple processing of two consecutive symbol signals. The optical binary signals may uniquely identify the symbol encoded between the two symbol signals. Construction of the optical binary signal generation apparatus from a number of generation stages enables the optical receiver to have a simple, modular construction, which may allow easy upgrading of the optical receiver to have an increased number of generation stages and therefore be able to process higher order N-QAM modulated signals.

In an embodiment, the optical binary signal generation apparatus comprises a first said generation stage comprising a first optical signal comparator and a second optical signal comparator. The first optical signal comparator is arranged to generate a first said optical binary signal having a binary signal level of one if an amplitude of a first one of the signal combinations is greater than an amplitude of a second one of the signal combinations. The first optical signal comparator is arranged to generate a first said optical binary signal having a binary signal level of zero if the amplitude of the said first signal combination is not greater than the amplitude of said second signal combination. The second optical signal comparator is arranged to generate a second said optical binary signal having a binary signal level of one if an amplitude of a third one of the signal combinations is greater than an amplitude of a fourth one of the signal combinations. The second optical signal comparator is arranged to generate a second said optical binary signal having a binary signal level of zero if the amplitude of the said third signal combination is not greater than the amplitude of said fourth signal combination. The optical binary signals are therefore generated with their signal levels depending on comparisons of the amplitudes of pairs of signal combinations which are obtained by simple processing of two consecutive symbol signals. The optical binary signals uniquely identify the symbol encoded between the two symbol signals, the symbol being a phase change. The optical receiver may perform symbol decisions on a 4-QAM optical communications signal. The optical receiver may be used to optically convert a 4-QAM optical communications signal into optical communications traffic bits.

In an embodiment, the first optical signal comparator is arranged to perform one of the following comparisons: is it true or false that $|S_i+S_{i-1}|>|S_i^{\pi/2}+S_{i-1}|$; is it true or false that $|S_i-S_{i-1}|>|S_i^{\pi/2}-S_{i-1}|$; is it true or false that $S_i^{\pi/}+S_{i-1}|>|S_i+S_{i-1}|$; and it true or false that $|S_i^{\pi/2}-S_{i-1}|>|S_i-S_{i-1}|$. The first optical signal comparator is arranged to generate a first said optical binary signal having a binary signal level of one if said comparison is true and to generate a first said optical binary signal having a binary signal level of zero if said comparison is false. The second optical signal comparator is arranged to perform one of the following comparisons: is it true or false that $|S_i+S_{i-1}|>|S_i^{\pi/2}-S_{i-1}|$; is it true or false that $|S_i-S_{i-1}|>|S_i^{\pi/2}+S_{i-1}|$; is it true or false that $|S_i^{\pi/2}+>|S_{i-1}|>|S_i-S_{i-1}|$; and it true or false that $|S_i^{\pi/2}-S_{i-1}|>|S_i+S_{i-1}|$. The second optical signal comparator is arranged to generate a second said optical binary signal having a binary signal level of one if said comparison is true and to generate a second said optical binary signal having a binary signal level of zero if said comparison is false. Each signal comparator may be arranged to carry out one of several comparisons between the signal combinations.

In an embodiment, the first optical signal comparator is arranged to perform the comparison: is it true or false that $|S_i^{\pi/2}+S_{i-1}|>|S_i+S_{i-1}|$; and the second optical signal comparator is arranged to perform the comparison: is it true or false that $|S_i+S_{i-1}|>|S_i^{\pi/2}-S_{i-1}|$.

In an embodiment, the first optical signal comparator is arranged to perform the comparison: it true or false that $|S_i^{\pi/}-S_{i-1}|>|S_i-S_{i-1}|$; and the second optical signal comparator is arranged to perform the comparison: is it true or false that $|S_i-S_{i-1}|>|S_i^{\pi/2}+S_{i-1}|$.

In an embodiment, the multilevel modulation format is 4-QAM.

In an embodiment, the optical binary signal generation apparatus comprises the first said generation stage and at least one subsequent said generation stage. Each subsequent generation stage comprises a first subsequent optical signal comparator and a second subsequent optical signal comparator. The first subsequent optical signal comparator is arranged to determine whether it is true or false that an amplitude of one of the signal combinations is greater than one of a threshold value and a combination an amplitude of another one of the signal combinations and a threshold value. The first subsequent optical signal comparator is arranged to generate a first subsequent optical binary signal having a binary signal level of one if it is true and a binary signal level of zero if it is false. The second subsequent optical signal comparator is arranged to determine whether it is true or false that an amplitude of one of the signal combinations is greater than one of a further threshold value and a combination an amplitude of another one of the signal combinations and a further threshold value. The second subsequent optical signal comparator is arranged to generate a second subsequent optical binary signal having a binary signal level of one if it is true and a binary signal level of zero if it is false.

Construction of the optical binary signal generation apparatus from a number of generation stages enables the optical receiver to have a simple, modular construction, which may allow easy upgrading of the optical receiver to have an increased number of generation stages and therefore be able to process higher order N-QAM modulated signals.

The optical binary signals uniquely identify the symbol encoded between the two symbol signals, the symbol representing both a phase change and an amplitude change. The optical receiver may perform symbol decisions on a 16-QAM optical communications signal. The optical receiver may be used to optically convert a 16-QAM optical communications signal into optical communications traffic bits.

In an embodiment, the first subsequent optical signal comparator is arranged to determine whether it is true or false that $\{|S_i-S_{i-1}|>|S_i+S_{i-1}|+\text{a first threshold value, Th1}\}$ or $\{|S_i+S_{i-1}|>|S_i-S_{i-1}|+\text{Th1}\}$ or $\{|Si^{\pi/2}+Si-1|>|Si^{\pi/2}-Si-1|+\text{a second}$ threshold value, Th2} or $\{|Si^{\pi/2}-S_{i-1}|>|S_i^{\pi/2}+S_{i-1}|+Th2\}$. The first subsequent optical signal comparator is arranged to generate a third said optical binary signal having a binary signal level of one if true and to generate a binary signal level of zero if false. The second subsequent optical signal comparator is arranged to determine whether it is true or false that $\{|S_i+S_{i-1}|+>$ a third threshold value, Th3} or $\{|S_i-S_{i-1}|>$ a fourth threshold value, Th4} or $\{|S_i^{\pi/2}+S_{i-1}|>$ a fifth threshold value, Th5} or $\{|S_i^{\pi/2}+S_{i-1}|>$ a sixth threshold value, Th6} or $\{|S_i-S_{i-1}|>|S_i+S_{i-1}|+$ a seventh threshold value, Th7} or $\{|S_i^{\pi/2}-S_{i-1}|>\{|S_i^{\pi/2}+S_{i-1}|+$ an eighth threshold value, Th8}. The second subsequent optical signal comparator is arranged to generate a fourth said optical binary signal having a binary signal level of one if true and to generate a binary signal level of zero if false. Th1=K1+A+B, Th2=K1+A+C, Th3=K2+C+C2+C3, Th4=K2+C+NOT(C2)+C3, Th5=K2+B+C2+C3, Th6=K2+B+NOT(C2)+C3, Th7=B+NOT(C3) and Th8=C+NOT(C3). A is one if $|S_{i-1}|>$K3 and is zero otherwise. B is one if C1 or C2 but not both are one and is zero otherwise. C is one if C1 equals C2 and is zero otherwise, where C1 is the binary level of the first optical binary signal, C2 is the binary level of the second optical binary signal and K1, K2 and K3 are constants.

In an embodiment, K1 is the minimum value of $|S_i-S_{i-1}|+|S_i+S_{i-1}|/2$, K2 is the average of the two lowest values of $|S_i-S_{i-1}|$, and K3=$(|P_{11}|+|P_{16}|)/2$, where $|P_{11}|$ is the amplitude of a first point having $\pi/2$ phase in the first quadrant of a 16-QAM constellation diagram and $|P_{16}|$ is the amplitude of a second point having $\pi/2$ phase in the first quadrant of said 16-QAM constellation diagram.

In an embodiment, the optical binary signal generation apparatus comprises one subsequent optical signal comparator and the multilevel modulation format comprises 16-QAM.

In an embodiment, the optical binary signal generation apparatus comprises n optical signal comparators and the multilevel modulation format comprises N-QAM.

In an embodiment, each optical signal comparator comprises an optical thresholder. In an embodiment, the optical thresholder is an amplitude sensitive optical thresholder. In an embodiment, the optical thresholder comprises a semiconductor micro-ring resonator. The optical receiver may enable phase-modulated optical communications signals to be converted in the optical domain into optical communications traffic bits using amplitude-sensitive nonlinear devices.

In an embodiment, the optical receiver further comprises optical detection apparatus and a controller. The optical detection apparatus is arranged to determine the respective binary signal level of each optical binary signal. The controller is arranged to obtain a phase change between the symbol signals in dependence on the optical binary signal levels. The optical receiver is able to make symbol decisions and generate the respective symbols.

In an embodiment, the controller is arranged to compare the optical binary signal levels with pre-stored sets of optical binary signal levels and to determine which set the optical binary signal levels match. Each pre-stored set corresponds to a unique phase change. The controller is arranged to retrieve the phase change of the matching set.

A third aspect of the invention provides an optical signal regenerator comprising an optical receiver, an optical combiner and an optical output. The optical receiver comprises an input and an optical circuit. The input is arranged to receive an optical communications signal having a differentially encoded multilevel modulation format having a plurality, N, of constellation points. The optical circuit is arranged to receive a consecutive pair of symbol signals of said optical communications signal, the pair of symbol signals differentially encoding a plurality of communications traffic bits. The optical circuit is arranged to generate a plurality, k=log 2N, of optical binary signals in dependence on the symbol signals, each optical binary signal having a respective binary signal level. The optical binary signals form optical versions of the encoded communications traffic bits. The optical combiner is arranged to receive said optical binary signals and combine said signals into an output optical signal. The optical output arranged to output said output optical signal.

The optical regenerator is able to make symbol decisions in the optical domain on a differentially encoded multilevel modulated optical communications signal. The optical regenerator may therefore overcome the frequency bandwidth limitations of electronic devices which are experienced when regenerating communications signals in the electrical domain. The optical regenerator is able to optically regenerate the traffic bits carried by the optical communications signal. The optical regenerator may be used in an optical communications network to optically make symbol decisions and to regenerate communications traffic bits, which may reduce the network complexity and enable the use of complex routing architectures. The optical regenerator may avoid the power heavy opto-electro-opto signal conversions used when optical signal regeneration is carried out in the electrical domain. The optical regenerator may be suitable to optically regenerate multilevel phase and amplitude modulated optical communications signals. In an embodiment, each optical binary signal is an on-off keying, OOK, modulated optical signal. The optical regenerator is thus able to regenerate a received multilevel modulated signal into OOK signals suitable for further processing in the optical domain.

In an embodiment, the multilevel modulation format is a quadrature amplitude modulation, QAM, modulation format.

In an embodiment, the optical circuit comprises an optical splitter, first, second and third optical paths, first and second signal combiners and optical binary signal generation apparatus. The optical splitter is arranged to receive each symbol signal and to power split each symbol signal into a first part, a second part and a third part. The first optical path is arranged to transmit the first part to form an unmodified symbol signal, $S_i$. The second optical path is arranged to apply a time delay to the second part, the time delay being the symbol time of the optical communications signal, to form a delayed symbol signal, $S_{i-1}$. The second optical path is arranged to power split the delayed symbol signal into a first part and a second part. The third optical path is arranged to apply a $\pi/2$ phase shift to the third part to form a phase rotated symbol signal, $S_i^{\pi/2}$. The first signal combiner is arranged to receive the unmodified symbol signal and a first part of the delayed symbol signal, and is arranged to form the signal combinations $S_i+S_{i-1}$ and $S_i-S_{i-1}$. The second signal combiner is arranged to receive the second part of the delayed symbol signal and the phase rotated symbol signal, and is arranged to form the signal combinations $S_i^{\pi/2}+S_{i-1}$ and $S_i^{\pi/2}-S_{i-1}$. The optical binary signal generation apparatus comprises a number, n, of generation stages, where $N=2^{2n}$. Each generation stage is arranged to generate two said optical binary signals in dependence on said signal combinations. The optical binary signals are generated in dependence on a small number of optical signals which are obtained by simple processing of two consecutive symbol signals. The optical binary signals may uniquely identify the symbol encoded between the two symbol signals. Construction of the optical binary signal generation apparatus from a number of generation stages enables the optical regenerator to have a simple, modular construction, which may allow easy upgrading of the optical regenerator to have an increased number of generation stages and therefore be able to regenerate higher order N-QAM modulated signals.

In an embodiment, the optical binary signal generation apparatus comprises a first said generation stage comprising a first optical signal comparator and a second optical signal comparator. The first optical signal comparator is arranged to generate a first said optical binary signal having a binary signal level of one if an amplitude of a first one of the signal combinations is greater than an amplitude of a second one of the signal combinations. The first optical signal comparator is arranged to generate a first said optical binary signal having a binary signal level of zero if the amplitude of the said first signal combination is not greater than the amplitude of said second signal combination. The second optical signal comparator is arranged to generate a second said optical binary signal having a binary signal level of one if an amplitude of a third one of the signal combinations is greater than an amplitude of a fourth one of the signal combinations. The second optical signal comparator is arranged to generate a second said optical binary signal having a binary signal level of zero if the amplitude of the said third signal combination is not greater than the amplitude of said fourth signal combination. The optical binary signals are therefore generated with their signal levels depending on comparisons of the amplitudes of pairs of signal combinations which are obtained by simple processing of two consecutive symbol signals. The optical binary signals uniquely identify the symbol encoded between the two symbol signals, the symbol being a phase change. The optical regenerator may perform symbol decisions on a 4-QAM optical communications signal. The optical regenerator may be used to optically regenerate a 4-QAM optical communications signal.

In an embodiment, the first optical signal comparator is arranged to perform one of the following comparisons: is it true or false that $|S_i+S_{i-1}|>|S_i^{\pi/2}+S_{i-1}|$; is it true or false that $|S_i-S_{i-1}|>|S_i^{\pi/2}-S_{i-1}|$; is it true or false that $|S_i^{\pi/2}+S_{i-1}|>|S_i+S_{i-1}|$; and it true or false that $|S_i^{\pi/2}-S_{i-1}|>|S_i-S_{i-1}|$. The first optical signal comparator is arranged to generate a first said optical binary signal having a binary signal level of one if said comparison is true and to generate a first said optical binary signal having a binary signal level of zero if said comparison is false. The second optical signal comparator is arranged to perform one of the following comparisons: is it true or false that $|S_i+S_{i-1}|>|S_i^{\pi/2}-S_{i-1}|$; is it true or false that $|S_i-S_{i-1}|>|S_i^{\pi/2}+S_{i-1}|$; is it true or false that $|S_i^{\pi/2}+S_{i-1}|>|S_i-S_{i-1}|$; and it true or false that $|S_i^{\pi/2}-S_{i-1}|>|S_i+S_{i-1}|$. The second optical signal comparator is arranged to generate a second said optical binary signal having a binary signal level of one if said comparison is true and to generate a second said optical binary signal having a binary signal level of zero if said comparison is false. Each signal comparator may be arranged to carry out one of several comparisons between the signal combinations.

In an embodiment, the first optical signal comparator is arranged to perform the comparison: is it true or false that $|S_i^{\pi/2}+S_{i-1}|>|S_i+S_{i-1}|$; and the second optical signal comparator is arranged to perform the comparison: is it true or false that $|S_i+S_{i-1}|>|S_i^{\pi/2}-S_{i-1}|$.

In an embodiment, the first optical signal comparator is arranged to perform the comparison: it true or false that $|S_i^{\pi/2}-S_{i-1}|>|S_i-S_{i-1}|$; and the second optical signal comparator is arranged to perform the comparison: is it true or false that $|S_i-S_{i-1}|>|S_i^{\pi/2}+S_{i-1}|$.

In an embodiment, the multilevel modulation format is 4-QAM.

In an embodiment, the optical binary signal generation apparatus comprises the first said generation stage and at least one subsequent said generation stage. Each subsequent generation stage comprises a first subsequent optical signal comparator and a second subsequent optical signal comparator. The first subsequent optical signal comparator is arranged to determine whether it is true or false that an amplitude of one of the signal combinations is greater than one of a threshold value and a combination an amplitude of another one of the signal combinations and a threshold value. The first subsequent optical signal comparator is arranged to generate a first subsequent optical binary signal having a binary signal level of one if it is true and a binary signal level of zero if it is false. The second subsequent optical signal comparator is arranged to determine whether it is true or false that an amplitude of one of the signal combinations is greater than one of a further threshold value and a combination an amplitude of another one of the signal combinations and a further threshold value. The second subsequent optical signal comparator is arranged to generate a second subsequent optical binary signal having a binary signal level of one if it is true and a binary signal level of zero if it is false.

Construction of the optical binary signal generation apparatus from a number of generation stages enables the optical receiver to have a simple, modular construction, which may allow easy upgrading of the optical receiver to have an increased number of generation stages and therefore be able to process higher order N-QAM modulated signals.

The optical binary signals uniquely identify the symbol encoded between the two symbol signals, the symbol representing both a phase change and an amplitude change. The optical regenerator may perform symbol decisions on a 16-QAM optical communications signal. The optical regenerator may be used to optically regenerate a 16-QAM optical communications signal.

In an embodiment, the first subsequent optical signal comparator is arranged to determine whether it is true or false that $\{|S_i-S_{i-1}|>|S_i+S_{i-1}|+$a first threshold value, Th1$\}$ or $\{|S_i+S_{i-1}|>|S_i-S_{i-1}|+$Th1$\}$ or $\{|Si^{\pi/2}+Si-1|>|Si^{\pi/2}-Si-1|+$a second threshold value, Th2$\}$ or $\{|Si^{\pi/2}-S_{i-1}|>|S_i^{\pi/2}+S_{i-1}|+$Th2$\}$. The first subsequent optical signal comparator is arranged to generate a third said optical binary signal having a binary signal level of one if true and to generate a binary signal level of zero if false. The second subsequent optical signal comparator is arranged to determine whether it is true or false that $\{|S_i+S_{i-1}|>$a third threshold value, Th3$\}$ or $\{|S_i-S_{i-1}|>$a fourth threshold value, Th4$\}$ or $\{|S_i^{\pi/2}+S_{i-1}|>$a fifth threshold value, Th5$\}$ or $\{|S_i^{\pi/2}+S_{i-1}|>$a sixth threshold value, Th6$\}$ or $\{|S_i-S_{i-1}|>|S_i+S_{i-1}|+$a seventh threshold value, Th7$\}$ or $\{|S_i^{\pi/2}-S_{i-1}|>\{|S_i^{\pi/2}+S_{i-1}|+$an eighth threshold value, Th8$\}$. The second subsequent optical signal comparator is arranged to generate a fourth said optical binary signal having a binary signal level of one if true and to generate a binary signal level of zero if false. Th1=K1+A+B, Th2=K1+A+C, Th3=K2+C+C2+C3, Th4=K2+C+NOT(C2)+C3, Th5=K2+B+C2+C3, Th6=K2+B+NOT(C2)+C3, Th7=B+NOT(C3) and Th8=C+NOT(C3). A is one if $|S_{i-1}|>$K3 and is zero otherwise. B is one if C1 or C2 but not both are one and is zero otherwise. C is one if C1 equals C2 and is zero otherwise, where C1 is the binary level of the first optical binary signal, C2 is the binary level of the second optical binary signal and K1, K2 and K3 are constants.

In an embodiment, K1 is the minimum value of $|S_i-S_{i-1}|+|S_i+S_{i-1}|/2$, K2 is the average of the two lowest values of $|S_i-S_{i-1}|$, and K3=$(|P_{11}|+|P_{16}|)/2$, where $|P_{11}|$ is the amplitude of a first point having $\pi/2$ phase in the first quadrant of a 16-QAM constellation diagram and $|P_{16}|$ is the amplitude of a second point having $\pi/2$ phase in the first quadrant of said 16-QAM constellation diagram.

In an embodiment, the optical binary signal generation apparatus comprises one subsequent optical signal comparator and the multilevel modulation format comprises 16-QAM.

In an embodiment, the optical binary signal generation apparatus comprises n optical signal comparators and the multilevel modulation format comprises N-QAM.

In an embodiment, each optical signal comparator comprises an optical thresholder. In an embodiment, the optical thresholder is an amplitude sensitive optical thresholder. In an embodiment, the optical thresholder comprises a semiconductor micro-ring resonator. The optical regenerator may enable phase-modulated optical communications signals to be regenerated in the optical domain using amplitude-sensitive nonlinear devices.

In an embodiment, the optical receiver further comprises optical detection apparatus and a controller. The optical detection apparatus is arranged to determine the respective binary signal level of each optical binary signal. The controller is arranged to obtain a phase change between the symbol signals in dependence on the optical binary signal levels. The optical receiver is able to make symbol decisions and generate the respective symbols.

In an embodiment, the controller is arranged to compare the optical binary signal levels with pre-stored sets of optical binary signal levels and to determine which set the optical binary signal levels match. Each pre-stored set corresponds to a unique phase change. The controller is arranged to retrieve the phase change of the matching set.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of converting an optical communications signal having a differentially encoded multilevel modulation format into communications traffic bits.

Embodiments of the invention will now be described, by way of example only, with reference to the accompanying drawings.

BRIEF DESCRIPTION OF THE DRAWINGS

FIG. 2 shows the steps of a method, according to a second embodiment of the invention, of converting an optical communications signal having a differentially encoded multilevel modulation format into communications traffic bits, the multilevel modulation format having a plurality, N, of constellation points;

FIG. 10 is a table of the results of four logic operations, C1, C2, C3, and C4, for all possible 64 symbol changes $S_{i-1} \rightarrow S_i$ of the 16-QAM constellation of FIG. 8;

FIG. 18 shows: (a) a schematic representation of an optical circuit arranged to implement the logic operations In1 EQ In2 and In1 XOR In2, for use in the optical receiver of FIG. 17; (b) a schematic representation of an optical circuit arranged to implement the logic operation |In|>K, for use in the optical receiver of FIG. 17; and (c) a schematic representation of an optical circuit arranged to implement the logic operation NOT(In), for use in the optical receiver of FIG. 17;

DETAILED DESCRIPTION

Figure 1:
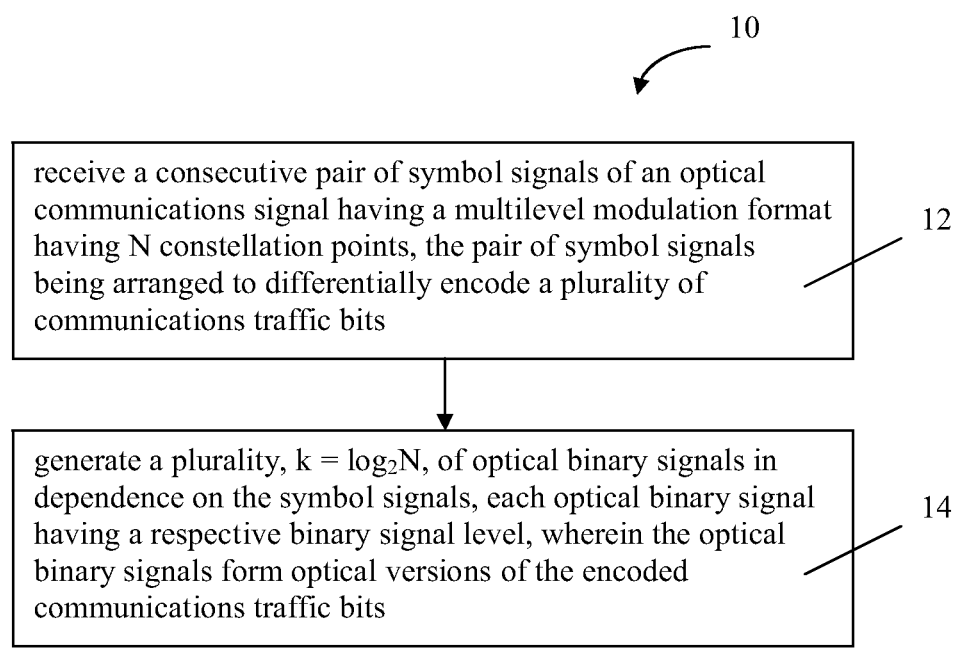
FIG. 1 shows the steps of a method, according to a first embodiment of the invention, of converting an optical communications signal having a differentially encoded multilevel modulation format into communications traffic bits, the multilevel modulation format having a plurality, N, of constellation points.

Referring to FIG. 1, a first embodiment of the invention provides a method 10 of converting an optical communications signal having a differentially encoded multilevel modulation format into communications traffic bits. The multilevel modulation format has a plurality, N, of constellation points.

The method 10 comprises:

a. receiving a consecutive pair of symbol signals of said optical communications signal 12; and b. generating a plurality, k=$\log_2$ N, of optical binary signals in dependence on the symbol signals, each optical binary signal having a respective binary signal level, wherein the optical binary signals form optical versions of the encoded communications traffic bits 14.

The pair of symbol signals have been arranged to differentially encode a plurality of communications traffic bits.

A second embodiment of the invention provides a method 20 of converting an optical communications signal having a differentially encoded multilevel modulation format into communications traffic bits. The steps of the method 20 are shown in FIG. 2.

The method 20 of this embodiment is similar to the method 10 of FIG. 1, with the following modifications. The same reference numbers are retained for corresponding steps.

In this embodiment, step b. comprises i. receiving a first symbol signal, $S_{i-1}$, of the pair and receiving a second symbol signal, $S_i$, of the pair 22;

ii. forming a phase-rotated version of the second symbol signal, $S_i^{\pi/2}$, having a $\pi/2$ phase difference relative to the second symbol signal, $S_i$ 24;

iii. forming each of the following signal combinations: $S_i+S_{i-1}$; $S_i-S_{i-1}$; $S_i^{\pi/2}+S_{i-1}$; and $S_i^{\pi/2}-S_{i-1}$ 26; and iv. generating a plurality, k, of optical binary signals in a number, n, of generation steps, where N=$2^{2n}$, each generation step being arranged to generate two said optical binary signals in dependence on said signal combinations 28.

Figure 3:
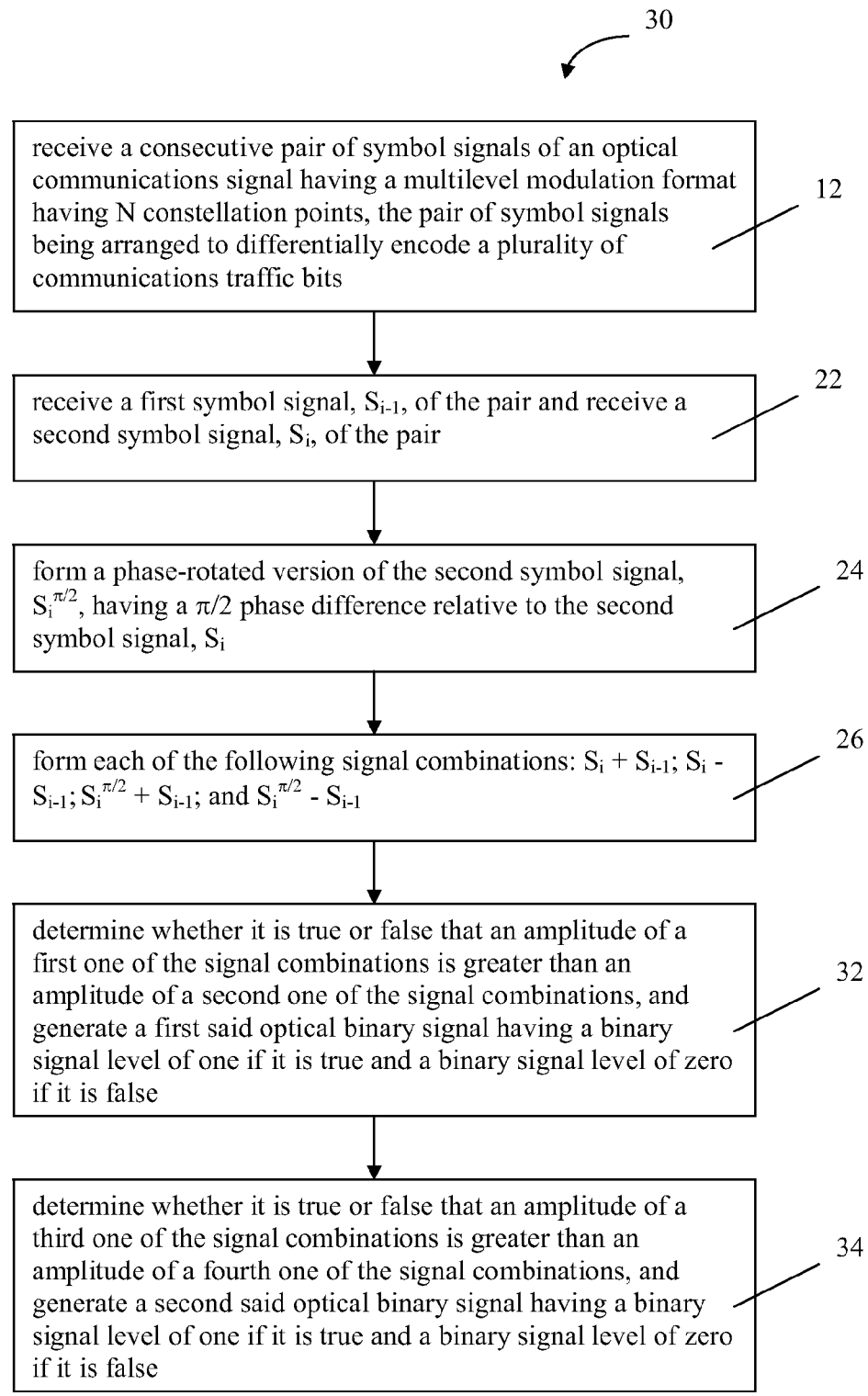
FIG. 3 shows the steps of a method, according to a third embodiment of the invention, of converting an optical communications signal having a differentially encoded multilevel modulation format into communications traffic bits, the multilevel modulation format having a plurality, N, of constellation points.

A third embodiment of the invention provides a method 30 of converting an optical communications signal having a differentially encoded multilevel modulation format into communications traffic bits. The steps of the method 30 are shown in FIG. 3.

The method 30 of this embodiment is similar to the method 20 of FIG. 2, with the following modifications. The same reference numbers are retained for corresponding steps.

In this embodiment, step iv. comprises a first said generation step comprising:

A. determining whether it is true or false that an amplitude of a first one of the signal combinations is greater than an amplitude of a second one of the signal combinations, and generating a first said optical binary signal having a binary signal level of one if it is true and a binary signal level of zero if it is false 32; and B. determining whether it is true or false that an amplitude of a third one of the signal combinations is greater than an amplitude of a fourth one of the signal combinations, and generating a second said optical binary signal having a binary signal level of one if it is true and a binary signal level of zero if it is false 34.

Figure 4:
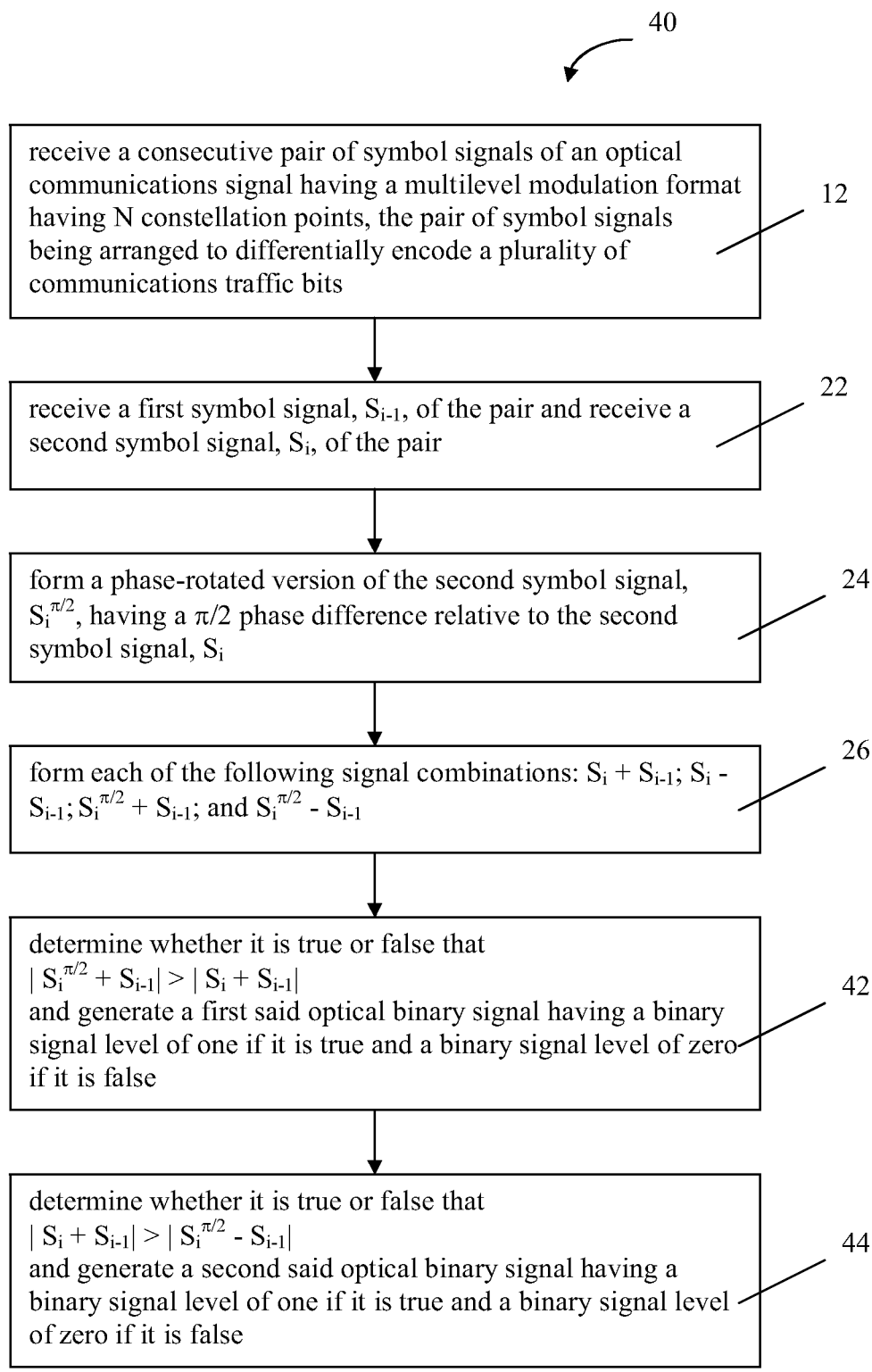
FIG. 4 shows the steps of a method, according to a fourth embodiment of the invention, of converting an optical communications signal having a differentially encoded multilevel modulation format into communications traffic bits, the multilevel modulation format having a plurality, N, of constellation points.

A fourth embodiment of the invention provides a method 40 of converting an optical communications signal having a differentially encoded multilevel modulation format into communications traffic bits. The steps of the method 40 are shown in FIG. 4.

The method 40 of this embodiment is similar to the method 30 of FIG. 3, with the following modifications. The same reference numbers are retained for corresponding steps.

In this embodiment, step iv. comprises a first said generation step comprising:

A. determining one of: is it true or false that $|S_i+S_{i-1}|>|S_i^{\pi/2}+S_{i-1}|$; is it true or false that $|S_i-S_{i-1}|>|S_i^{\pi/2}-S_{i-1}|$; is it true or false that $|S_i^{\pi/2}+S_{i-1}|>|S_i+S_{i-1}|$; and it true or false that $|S_i^{\pi/2}-S_{i-1}|>|S_i-S_{i-1}|$ 42; and B. determining one of: is it true or false that $|S_i+S_{i-1}|>|S_i^{\pi/2}-S_{i-1}|$; is it true or false that $|S_i-S_{i-1}|>|S_i^{\pi/2}+S_{i-1}|$; is it true or false that $|S_i^{\pi/2}+S_{i-1}|>|S_i-S_{i-1}|$; and it true or false that $|S_i^{\pi/2}-S_{i-1}|>|S_i+S_{i-1}|$ 44.

Figure 5:
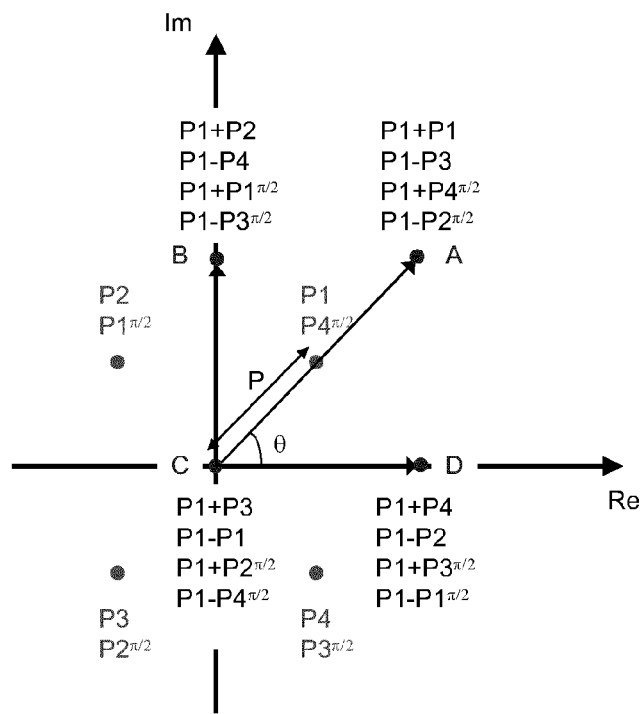
FIG. 5 shows a constellation of a 4-QAM signal (red dots) and signals resulting from operations between the constellation points (blue dots), the superscript $\pi/2$ indicating that the signal has been rotated by $\pi/2$ degrees.

FIG. 5 shows the constellation of a 4-QAM signal having four constellation points, P1, P2, P3, and P4, each with an amplitude |P|. If the signal is differentially encoded the phase change information is represented by a change between two consecutive symbols ($S_{i-1} \rightarrow S_i$). In the case of 4-QAM this is exclusively a phase change.

If we consider the $(i-1)^{th}$ symbol, $S_{i-1}$, is P1, the four potential phase changes, 0, $\pi/2$, $\pi$, $3\pi/2$ (or $-\pi/2$), are represented by the symbol changes P1$\rightarrow$P1, P1$\rightarrow$P2, P1$\rightarrow$P3, and P1$\rightarrow$P4 respectively.

Similarly, for a generic symbol $S_{i-1}$, the change $S_{i-1} \rightarrow Si$ corresponds to a phase change of 0, $\pi/2$, $\pi$, $3\pi/2$ (or $-\pi/2$). In order to decide which of the potential phase changes has occurred we consider the following signal combinations:

$$S_i+S_{i-1}$$

$$S_i-S_{i-1}$$

$$S_i^{\pi/2}+S_{i-1}$$

$$S_i^{\pi/2}-S_{i-1}$$

where the superscript $\pi/2$ indicates that the signal has been rotated by $\pi/2$.

Each signal combination is calculated for each potential symbol change, and the resulting signals are also shown in FIG. 5. Each of the signal combinations has one of four different amplitudes, A, B, C, and D, with |A|>|B|, |B|=|D|, and |D|>|C|.

By comparing the amplitudes of some of the signal combinations it is possible to identify the phase change which has occurred, i.e. to make a symbol decision. For a 4-QAM signal we need to carry out two comparisons. There are several pair of comparisons which are able to uniquely identify the phase change.

Two possible comparisons are:

$$|S_i^{\pi/2}+S_{i-1}|>?|S_i+S_{i-1}| \qquad \text{C1:}$$

$$|S_i+S_{i-1}|>?|S_i^{\pi/2}-S_{i-1}| \qquad \text{C2:}$$

where >? means "is it greater than?" The answer of each comparison is Yes (True) or No (False). A Yes/True answer is represented generating an OOK modulated optical signal having a signal level "1" and a No/False answer is represented by generating an OOK modulated optical signal having a signal level "0".

Figure 6:
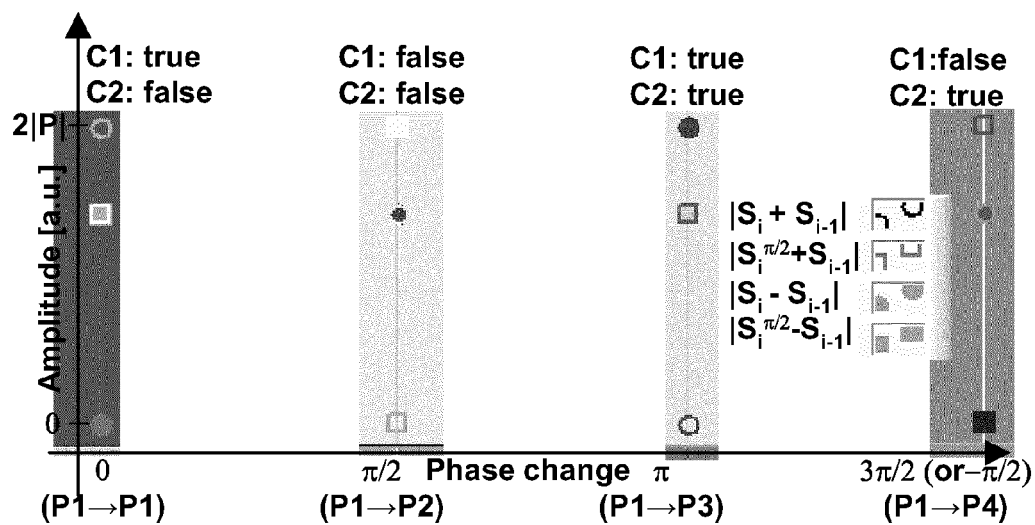
FIG. 6 shows the amplitude of the four signal combinations $(S_i+S_{i-1}, S_i-S_{i-1}, S_i^{\pi/2}+S_{i-1}, S_i^{\pi/2}-S_{i-1})$ for each one of four possible symbol changes between the symbols of the constellation of FIG. 5, i.e. phase change $0, \pi/2, \pi,$ op $3\pi/2$, and the results of first and second comparisons, C1 and C2, between pairs of the signal combinations.

FIG. 6 shows the amplitudes of the four signal combinations, $S_i+S_{i-1}$; $S_i-S_{i-1}$; $S_i^{\pi/2}+S_{i-1}$; and $S_i^{\pi/2}-S_{i-1}$, for each one of the four possible symbol changes, i.e. phase changes 0, $\pi/2$, $\pi$, and $3\pi/2$. The results of the two comparisons C1 and C2 are also shown. We can see that each symbol change has a unique set of Yes/No outputs from the comparisons C1 and C2, therefore the combination of the two comparisons makes it possible to uniquely identify the phase change and therefore make a symbol decision.

An alternative pair of comparisons which may be used is:

$$|S_i^{\pi/2}-S_{i-1}|>?|S_i-S_{i-1}| \quad \text{C1'}:$$

$$|S_i-S_{i-1}|>?|S_i^{\pi/2}+S_{i-1}| \quad \text{C2'}:$$

Figure 7:
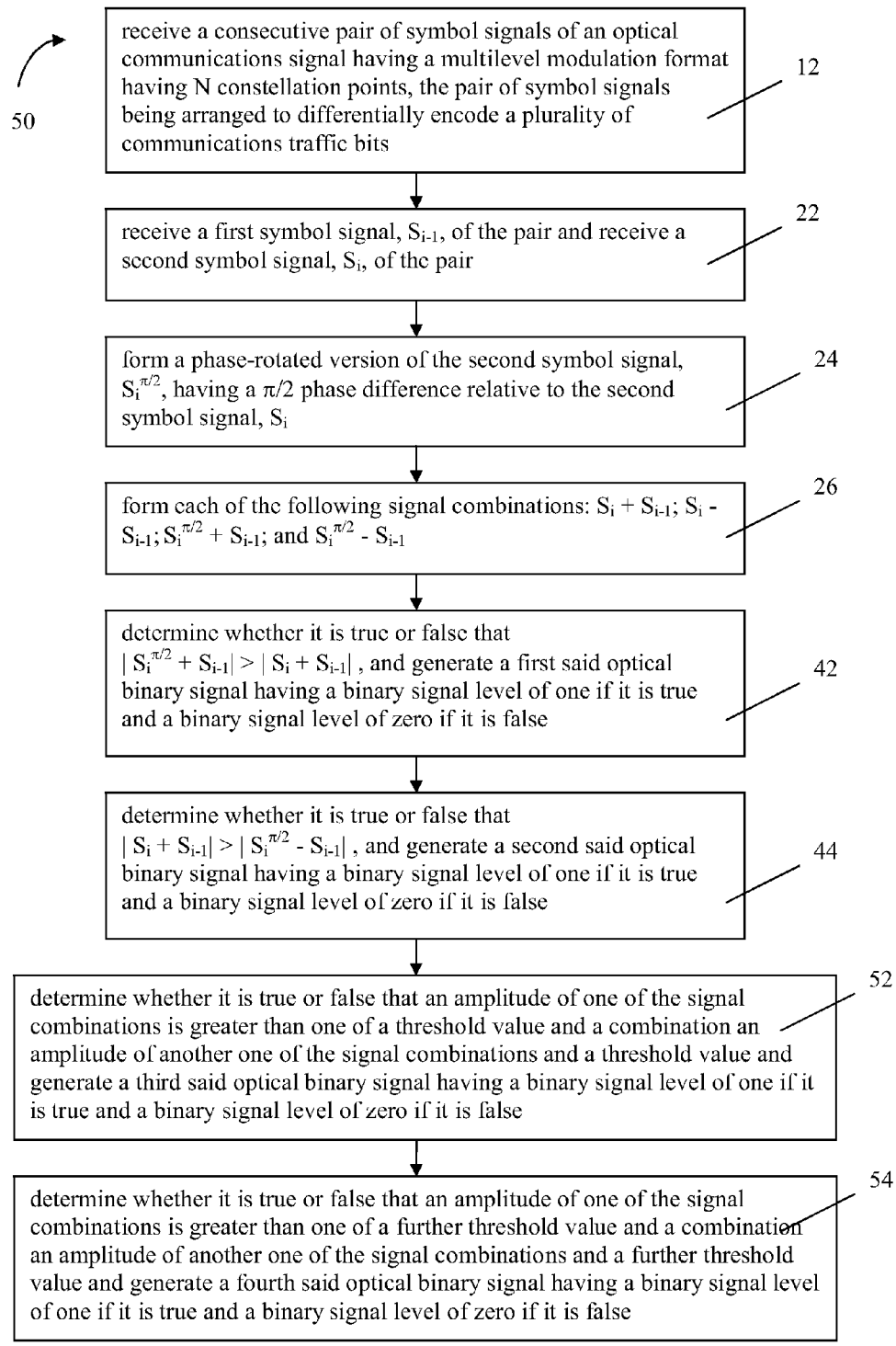
FIG. 7 shows the steps of a method, according to a fifth embodiment of the invention, of converting an optical communications signal having a differentially encoded multilevel modulation format into communications traffic bits, the multilevel modulation format having a plurality, N, of constellation points.

A fifth embodiment of the invention provides a method 50 of converting an optical communications signal having a differentially encoded multilevel modulation format into communications traffic bits. The steps of the method 50 are shown in FIG. 7.

The method 50 of this embodiment is similar to the method 40 of FIG. 4, with the following modifications. The same reference numbers are retained for corresponding steps.

In this embodiment, step iv. comprises a subsequent generation step 52, 54. The subsequent generation step comprises a first logic operation 52 and a second logic operation 54.

The first logic operation 52 comprises determining whether it is true or false that an amplitude of one of the signal combinations is greater than one of a threshold value and a combination an amplitude of another one of the signal combinations and a threshold value. The first logic operation 52 also comprises generating a first subsequent optical binary signal having a binary signal level of one if it is true and a binary signal level of zero if it is false.

The second logic operation 54 comprises determining whether it is true or false that an amplitude of one of the signal combinations is greater than one of a further threshold value and a combination an amplitude of another one of the signal combinations and a further threshold value. The second logic operation 54 also comprises generating a second subsequent optical binary signal having a binary signal level of one if it is true and a binary signal level of zero if it is false.

Figure 8:
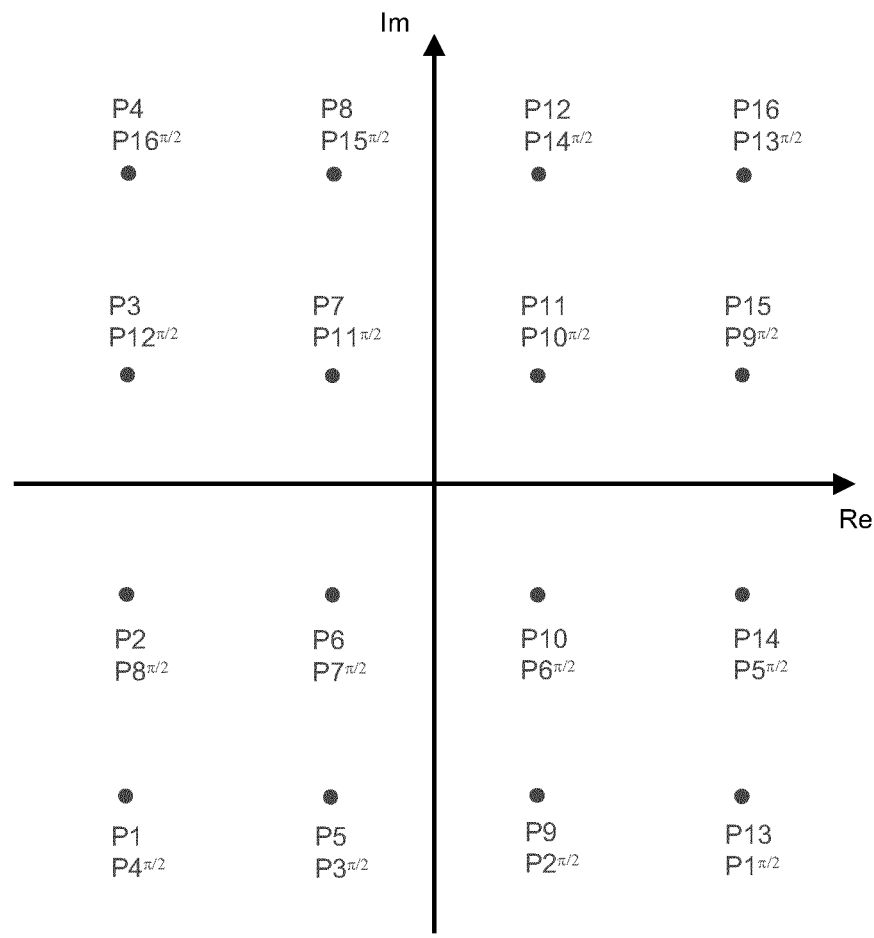
FIG. 8 shows a constellation of a 16-QAM signal, the superscript $\pi/2$ indicating that the signal has been rotated by $\pi/2$ degrees.

FIG. 8 shows the constellation of a 16-QAM signal that has sixteen constellation points, P1 to P16. If the 16-QAM signal is differentially encoded the information is represented by a change between two consecutive symbols, $S_{i-1} \rightarrow S_i$, but now the information is not exclusively a phase change but both a phase change and an amplitude change.

Let us consider the $(i-1)^{th}$ symbol, $S_{i-1}$ is P1. The 16 potential levels of information are represented by the changes P1→P1, P1→P2, ..., and P1→P16 and correspond to a phase and amplitude change. Similarly for a generic symbol $S_{i-1}$.

We can show that there are 64 possible symbol changes that correspond to changes from a symbol, $S_{i-1}$, in the first quadrant (P11, P12, P15, P16) to a generic symbol, $S_i$ (P1, ..., P16). All other potential symbol changes correspond to one of these symbol changes with $S_{i-1}$ rotated by $\pi/2$, $\pi$, or $3\pi/2$. This phase rotation does not affect the operations described below.

As for the 4-QAM case, in order to decide which one of the symbol changes has occurred we exploit the signal combinations:

$$S_i+S_{i-1}$$

$$S_i-S_{i-1}$$

$$S_i^{\pi/2}+S_{i-1}$$

$$S_i^{\pi/2}-S_{i-1}$$

In this embodiment, the optical binary signal generation comprises two steps, each having respective comparisons. The first optical binary signal generation step is the same as described above in FIGS. 4 to 6.

Figure 9:
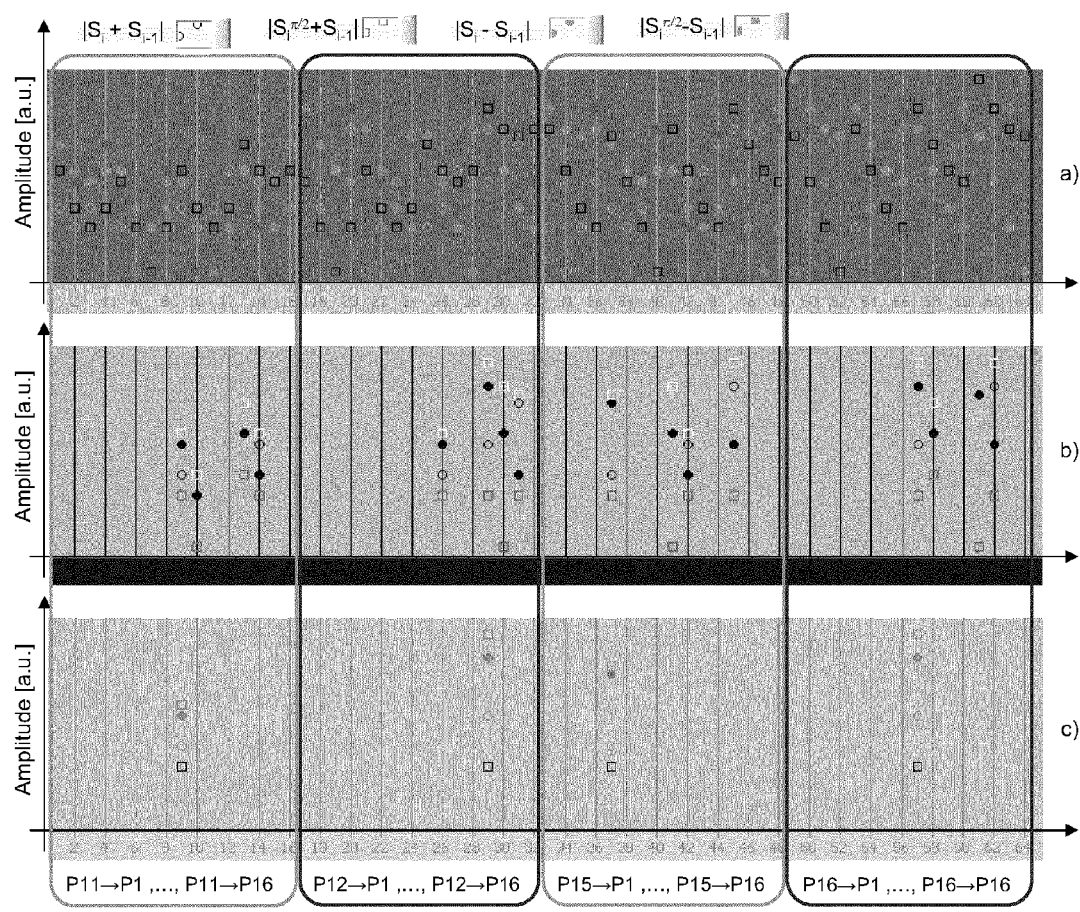
FIG. 9 shows $|S_i+S_{i-1}|, |S_i-S_{i-1}|, |S_i^{\pi/2}+S_{i-1}|, |S_i^{\pi/2}-S_{i-1}|$, for (a) all the 64 possible changes $(S_{i-1} \rightarrow S_i)$, with $S_{i-1}$ in the first quadrant $(S_{i-1}=P11, P12, P15, P16)$, (b) just the cases satisfying C1 and C2, (c) just the cases satisfying C1, C2, C3, and C4.

FIG. 9(a) shows the amplitudes of the four signal combinations, $S_i+S_{i-1}$; $S_i-S_{i-1}$; $S_i^{\pi/2}+S_{i-1}$; and $S_i^{\pi/2}-S_{i-1}$, for each one of the 64 possible symbol changes with $S_{i-1}$ in the first quadrant of the constellation diagram. FIG. 9(b) shows only the signal combinations for which C1 and C2 are True.

In order to be able to uniquely identify the symbol change which has occurred we need to perform a second step of signal combination comparisons, in the second generation steps 54.

Two possible comparisons are:

$$\{|S_i-S_{i-1}|>?|S_i+S_{i-1}|+Th1\} \text{ or } \{|S_i+S_{i-1}|>?|S_i-S_{i-1}|+Th1\} \text{ or } \{|S_i^{\pi/2}+S_{i-1}|>?\{|S_i^{\pi/2}-S_{i-1}|+Th2\} \text{ or } \{|S_i^{\pi/2}-S_{i-1}|>?\{|S_i^{\pi/2}+S_{i-1}|+Th2\} \quad \text{C3:}$$

$$\{|S_i+S_{i-1}|>?Th3\} \text{ or } \{|S_i-S_{i-1}|>?Th4\} \text{ or } \{|S_i^{\pi/2}+S_{i-1}|>?Th5\} \text{ or } \{|S_i^{\pi/2}+S_{i-1}|>?Th5\} \text{ or } \{|S_i-S_{i-1}|>?|S_i+S_{i-1}|+Th7\} \text{ or } \{|S_i^{\pi/2}-S_{i-1}|>?\{|S_i^{\pi/2}+S_{i-1}|+Th8\} \quad \text{C4:}$$

where $Th1 = K1+A+B$ $Th2 = K1+A+C$ $Th3 = K2+C+C2+C3$ $Th4 = K2+C+\text{NOT}(C2)+C3$ $Th5 = K2+B+C2+C3$ $Th6 = K2+B+\text{NOT}(C2)+C3$ $Th7 = B+\text{NOT}(C3)$ $Th8 = C+\text{NOT}(C3)$ where $A$ is: true or false? $|S_{i-1}|>?K3$ $B$ is: true or false? $C1 \text{ XOR } C2$ $C$ is: true or false? $C1 \text{ EQ } C2$ and K1, K2 and K3 are constants. K1 is the minimum value of $|S_i-S_{i-1}|+|S_i+S_{i-1}|/2$, K2 is the average of the two lowest values of $|S_i-S_{i-1}|$ and $K3=(|P_{11}|+|P_{16}|)/2$, where $|P_{11}|$ is the amplitude of a first point having $\pi/2$ phase in the first quadrant of a 16-QAM constellation diagram and $|P_{16}|$ is the amplitude of a second point having $\pi/2$ phase in the first quadrant of said 16-QAM constellation diagram.

FIG. 9(c) shows the amplitudes of the signal combinations, $|S_i+S_{i-1}|$, $|S_i-S_{i-1}|$, $|S_i^{\pi/2}+S_{i-1}|$ and $|S_i^{\pi/2}-S_{i-1}|$, for only the changes $(S_{i-1} \rightarrow S_i)$, (with $S_{i-1}$ in the first quadrant) for which C1=true, C2=true, C3=true and C4=true. We can see that for each $S_{i-1}$ there is only one symbol change that satisfies the above mentioned conditions. The same happens for all cases of the corresponding true table shown in FIG. 10 where the results of the four comparison operations are shown for all 64 possible cases.

The four OOK signal levels therefore uniquely identify the phase and amplitude change which has occurred, enabling a symbol decision to be made.

Figure 11:
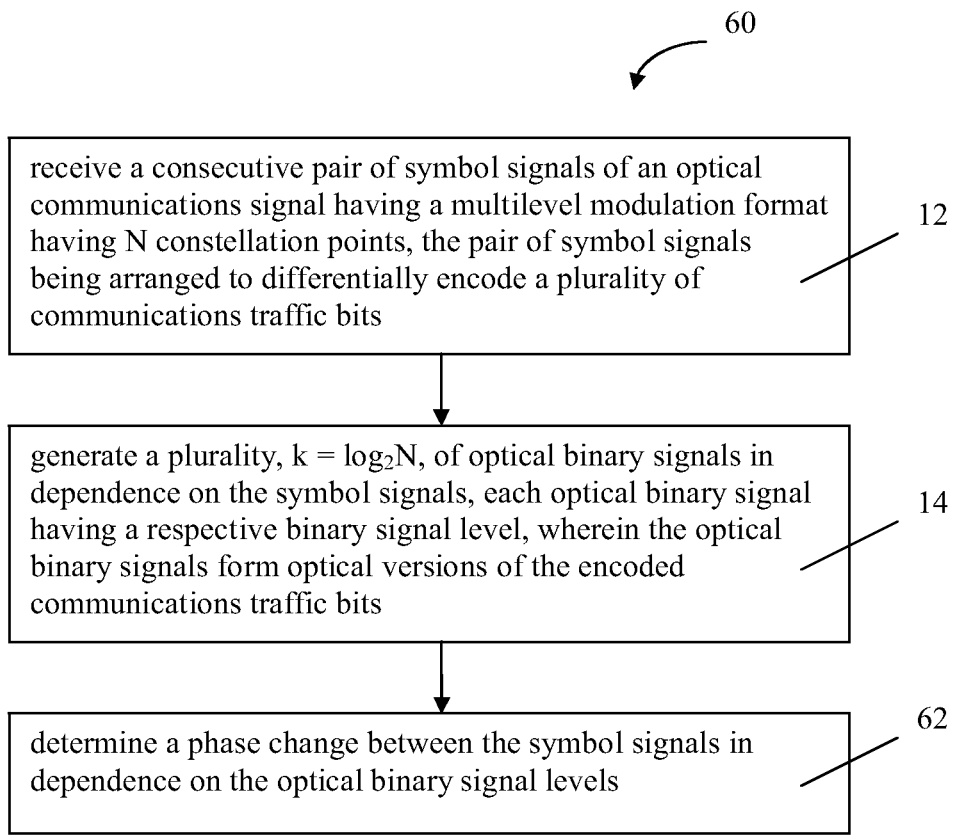
FIG. 11 shows the steps of a method, according to a sixth embodiment of the invention, of converting an optical communications signal having a differentially encoded multilevel modulation format into communications traffic bits, the multilevel modulation format having a plurality, N, of constellation points.

A sixth embodiment of the invention provides a method 60 of converting an optical communications signal having a differentially encoded multilevel modulation format into communications traffic bits. The steps of the method 60 are shown in FIG. 11.

The method 60 of this embodiment is similar to the method 10 of FIG. 1, with the following modifications. The same reference numbers are retained for corresponding steps.

In this embodiment, the method further comprises obtaining a phase change between the symbol signals in dependence on the optical binary signal levels 62.

The phase change may be obtained by comparing the optical binary signal levels with pre-stored sets of optical binary signal levels and determining which set the optical binary signal levels matches. Each pre-stored set corresponds to a unique phase change for a 4-QAM signal, as shown for example in FIG. 6, or a unique phase and amplitude change for a 16-QAM signal, as shown in FIG. 10. The phase change or phase and amplitude change of the matching set is retrieved, and the symbol is therefore identified.

Figure 12:
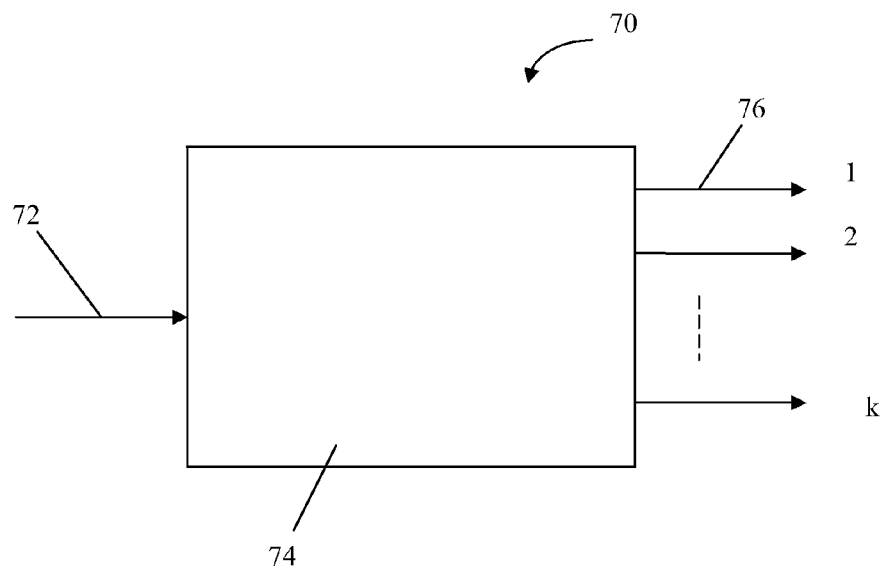
FIG. 12 shows a schematic representation of an optical receiver according to a seventh embodiment of the invention.

A seventh embodiment of the invention provides an optical receiver 70 as shown in FIG. 12. The optical receiver 70 comprises an input 72 and an optical circuit 74.

The input 72 is arranged to receive an optical communications signal having a differentially encoded multilevel modulation format. The modulation format has a plurality, N, of constellation points.

The optical circuit 74 is arranged to receive a consecutive pair of symbol signals of the optical communications signal. The pair of symbol signals differentially encode a plurality of communications traffic bits. The optical circuit is arranged to generate a plurality, $k=\log_2 N$, of optical binary signals 76 in dependence on the symbol signals. Each optical binary signal 76 has a respective binary signal level. The optical binary signals 76 form optical versions of the encoded communications traffic bits.

Figure 13:
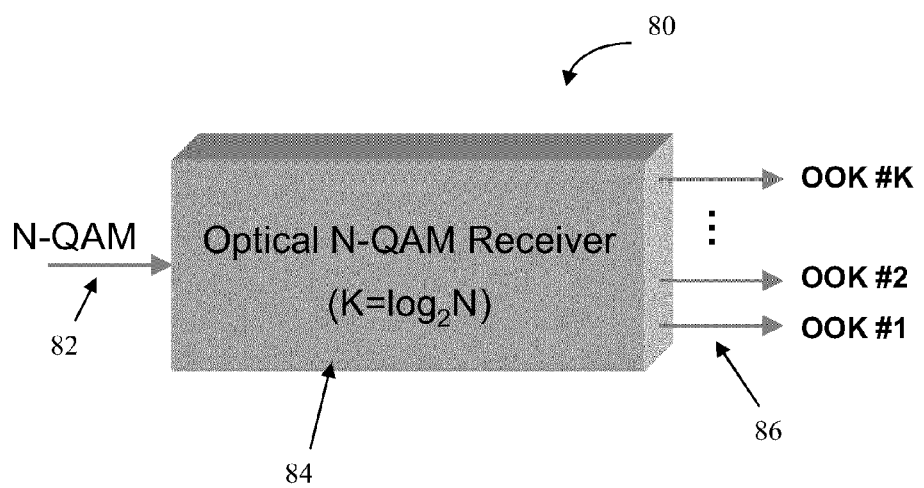
FIG. 13 shows a schematic representation of an optical receiver according to an eighth embodiment of the invention.

An eighth embodiment of the invention provides an optical receiver 80 as shown in FIG. 13. The optical receiver 80 comprises an input 82 and an optical circuit 84.

The input 82 is arranged to receive an optical communications signal having a differentially encoded quadrature amplitude modulation, N-QAM, modulation format having a plurality, N, of constellation points.

The optical circuit 84 is arranged to receive a consecutive pair of symbol signals of the optical communications signal 82. The pair of symbol signals differentially encode a plurality of communications traffic bits. The optical circuit 84 is arranged to generate a plurality, $k=\log_2 N$, of optical binary signals 86 in dependence on the symbol signals. Each optical binary signal 86 is an on-off keying, OOK, modulated optical signal and has a respective binary signal level. The OOK signals 86 form optical versions of the encoded communications traffic bits.

Figure 14:
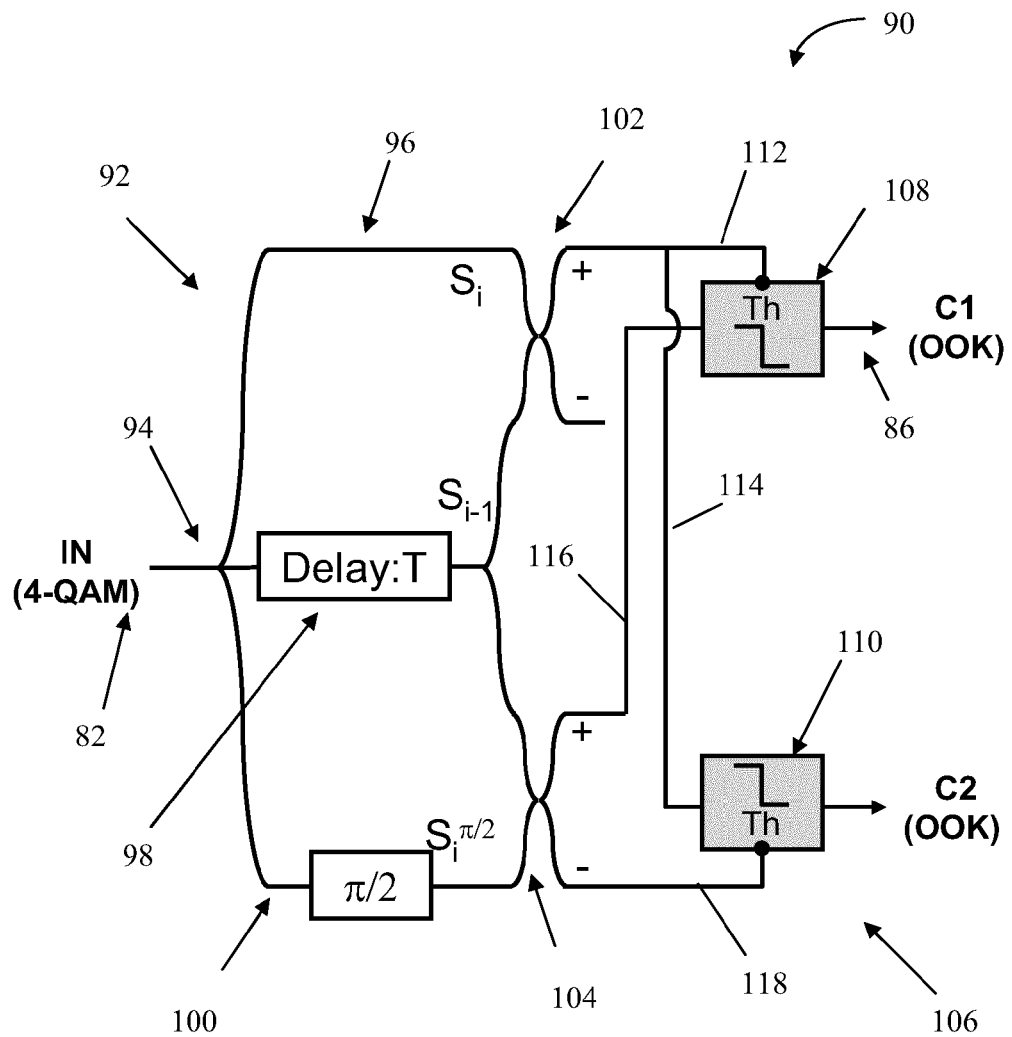
FIG. 14 shows a schematic representation of an optical receiver according to a ninth embodiment of the invention.

An optical receiver 90 according to a ninth embodiment of the invention is shown in FIG. 14. The optical receiver 90 of this embodiment is similar to the optical receiver 80 of FIG. 13 with the following modifications. The same reference numbers are retained for corresponding features.

In this embodiment, the optical circuit 92 comprises an optical splitter 94, a first optical path 96, a second optical path 98, a third optical path 100, a first signal combiner 102, a second signal combiner 104 and optical binary signal generation apparatus 106.

The optical splitter 94 is arranged to receive each symbol signal and to power split each symbol signal into a first part, a second part and a third part.

The first optical path 96 is arranged to transmit the first part of the symbol signal, to form an unmodified symbol signal, $S_i$. The second optical path 98 is arranged to apply a time delay to the second part of the symbol signal to form a delayed symbol signal, $S_{i-1}$. The second optical path 98 includes an optical delay line arranged to apply a delay, T. The time delay, T, is the symbol time of the optical communications signal. The second optical path 98 also includes a second optical splitter arranged to power split the delayed symbol signal into a first part and a second part. The third optical path 100 includes an optical phase shifter arranged to apply a $\pi/2$ phase shift to the third part of the symbol signal, to form a phase rotated symbol signal, $S_i^{\pi/2}$.

The first signal combiner 102 is arranged to receive the unmodified symbol signal $S_i$ and a first part of the preceding, delayed, symbol signal $S_{i-1}$. The first signal combiner is arranged to form the signal combinations $S_i+S_{i-1}$ and $S_i-S_{i-1}$, that is to say the sum of a consecutive pair of symbol signals and the difference of the consecutive pair of symbol signals. In this example the first signal combiner 102 is a 2×2 optical coupler.

The second signal combiner 104 is arranged to receive the second part of the preceding, delayed, symbol signal $S_{i-1}$ and the phase rotated symbol signal $S_i^{\pi/2}$. The second signal combiner is arranged to form the signal combinations $S_i^{\pi/2}+S_{i-1}$ and $S_i^{\pi/2}-S_{i-1}$, that is to say the sum of the consecutive pair of symbol signals and the difference of the consecutive pair of symbol signals, the second symbol signal of the pair having been phase rotated. In this example the second signal combiner 104 is also a 2×2 optical coupler.

The optical binary signal generation apparatus 106 comprising a number, n, of generation stages 106 where $N=2^{2n}$, each generation stage being arranged to generate two optical binary signals in dependence on the signal combinations. In this example, the optical binary signal generation apparatus 106 comprises 1 generation stage, therefore the optical receiver 90 may be used with 4-QAM signals. The generation stage 106 comprises a first optical signal comparator 108 and a second optical signal comparator 110. The outputs of the first and second signal combiners 102, 104 are connected to the first and second signal comparators 108, 110 by optical paths 112, 114, 116, 118.

The first optical signal comparator 108 is arranged to generate a first OOK signal 86. The first OOK signal is generated with a binary signal level of one if an amplitude of a first one of the signal combinations is greater than an amplitude of a second one of the signal combinations. The first OOK signal is generated with a binary signal level of zero if the amplitude of the said first signal combination is not greater than the amplitude of said second signal combination.

In this example, the first optical signal comparator 108 is an amplitude sensitive thresholder in the form of a semiconductor micro-ring resonator. The first thresholder 108 is arranged to receive the signal combinations $S_i+S_{i-1}$ and $S_i^{\pi/2}+S_{i-1}$ and is arranged to perform a first comparison, C1: is it true or false that $|S_i^{\pi/2}+S_{i-1}|>|S_i+S_{i-1}|$. If C1 is true, the first OOK signal is generated with a binary signal level "1". If C1 is false, the first OOK signal is generated with a binary signal level "0".

The second optical signal comparator 110 is arranged to generate a second OOK signal 86. The second OOK signal is generated with a binary signal level of one if an amplitude of a third one of the signal combinations is greater than an amplitude of a fourth one of the signal combinations. The second OOK signal is generated with a binary signal level of zero if the amplitude of the said third signal combination is not greater than the amplitude of said fourth signal combination.

In this example, the second optical signal comparator 110 is also an amplitude sensitive thresholder in the form of a semiconductor micro-ring resonator. The second thresholder 110 is arranged is arranged to receive the signal combinations $S_i+S_{i-1}$ and $S_i^{\pi/2}-S_{i-1}$ and is arranged to perform a second comparison, C2: is it true or false that $|S_i+S_{i-1}|>|S_i^{\pi/2}-S_{i-1}|$. If C2 is true, the second OOK signal is generated with a binary signal level "1". If C2 is false, the second OOK signal is generated with a binary signal level "0".

Figure 15:
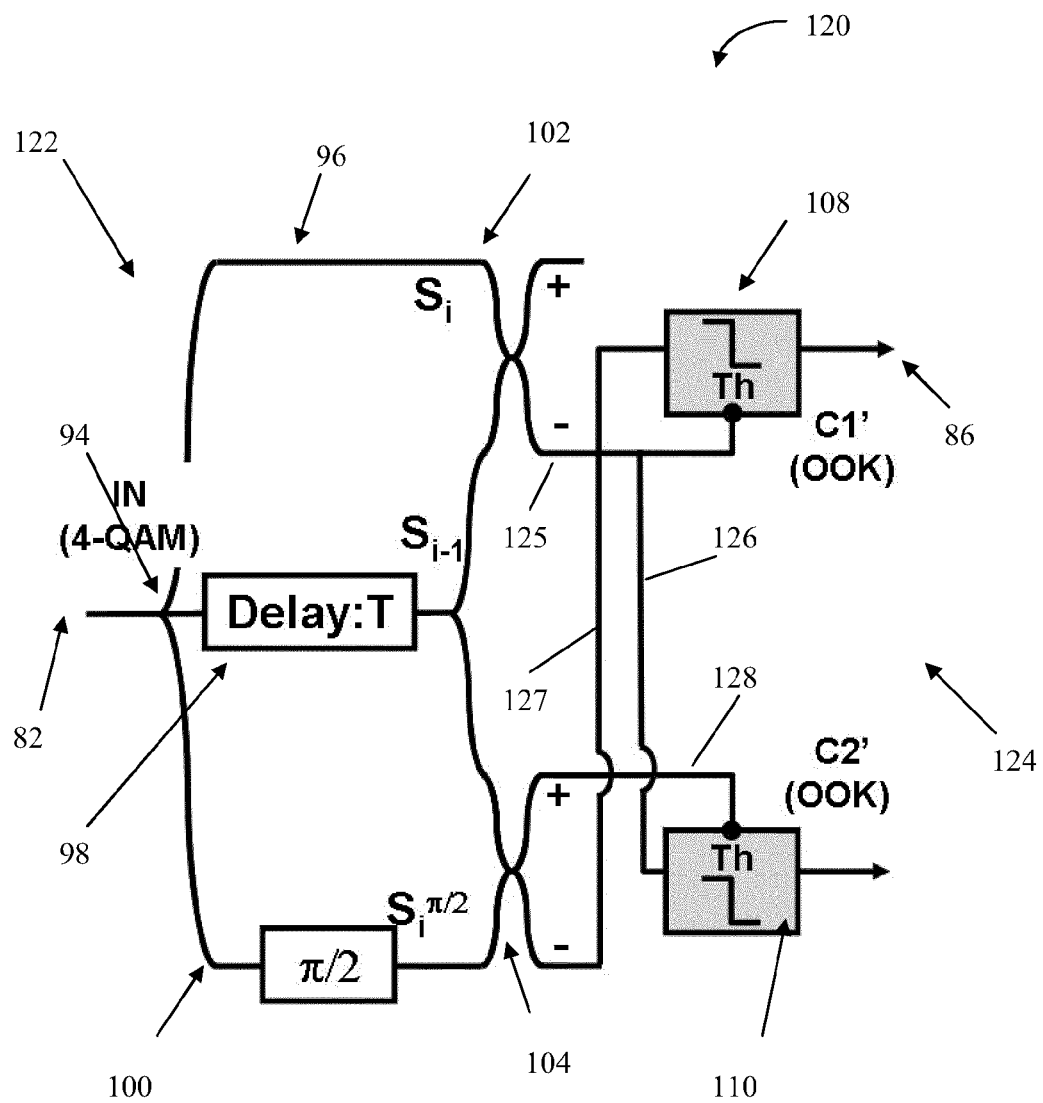
FIG. 15 shows a schematic representation of an optical receiver according to a tenth embodiment of the invention.

An optical receiver 120 according to a tenth embodiment of the invention is shown in FIG. 15. The optical receiver 120 of this embodiment is similar to the optical receiver 90 of FIG. 14 with the following modifications. The same reference numbers are retained for corresponding features.

In this embodiment, the first thresholder 108 is arranged to receive the signal combinations $S_i-S_{i-1}$ and $S_i^{\pi/2}-S_{i-1}$ and is arranged to perform a first comparison, C1': is it true or false that $|S_i^{\pi/2}-S_{i-1}|>|S_i-S_{i-1}|$. If C1' is true, the first OOK signal is generated with a binary signal level "1". If C1' is false, the first OOK signal is generated with a binary signal level "0".

The second optical signal comparator 110 is arranged is arranged to receive the signal combinations $S_i-S_{i-1}$ and $S_i^{\pi/2}+S_{i-1}$ and is arranged to perform a second comparison, C2': is it true or false that $|S_i-S_{i-1}|>|S_i^{\pi/2}+S_{i-1}|$. If C2' is true, the second OOK signal is generated with a binary signal level "1". If C2 is false, the second OOK signal is generated with a binary signal level "0".

Figure 16:
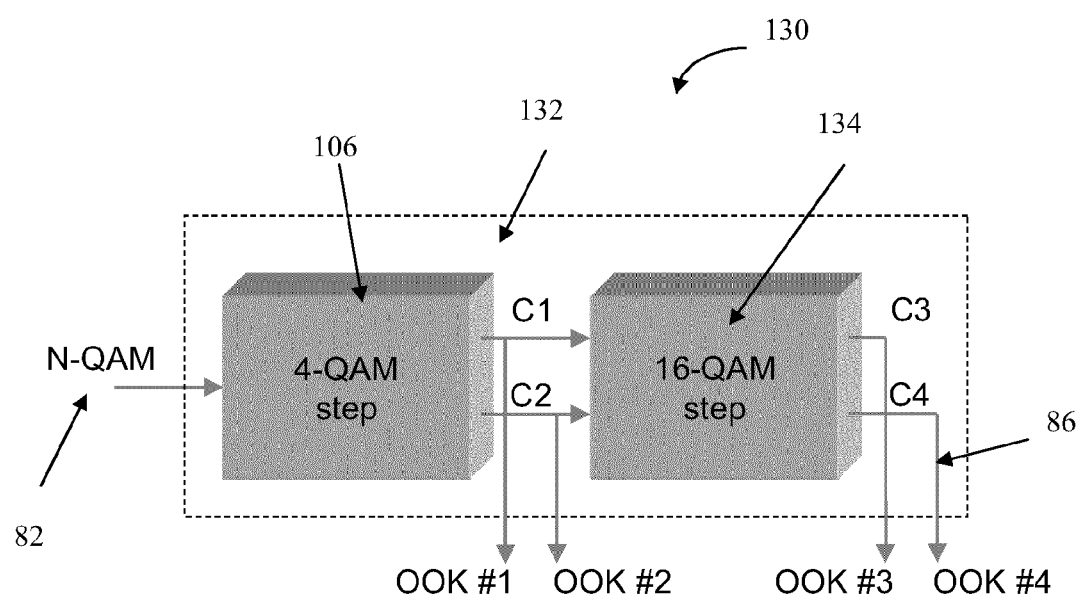
FIG. 16 shows a schematic representation of an optical receiver according to an eleventh embodiment of the invention.

An optical receiver 130 according to an eleventh embodiment of the invention is shown in FIG. 16. The optical receiver 130 of this embodiment is similar to the optical receiver 90 of FIG. 14 with the following modifications. The same reference numbers are retained for corresponding features.

In this embodiment, the optical circuit 132 comprises optical binary signal generation apparatus having two generation stages 106, 134, each being arranged to generate two OOK signals 86 in dependence on the signal combinations. In this example, the optical binary signal generation apparatus comprises 2 generation stages therefore the optical receiver 130 may be used with 16-QAM signals.

Figure 17:
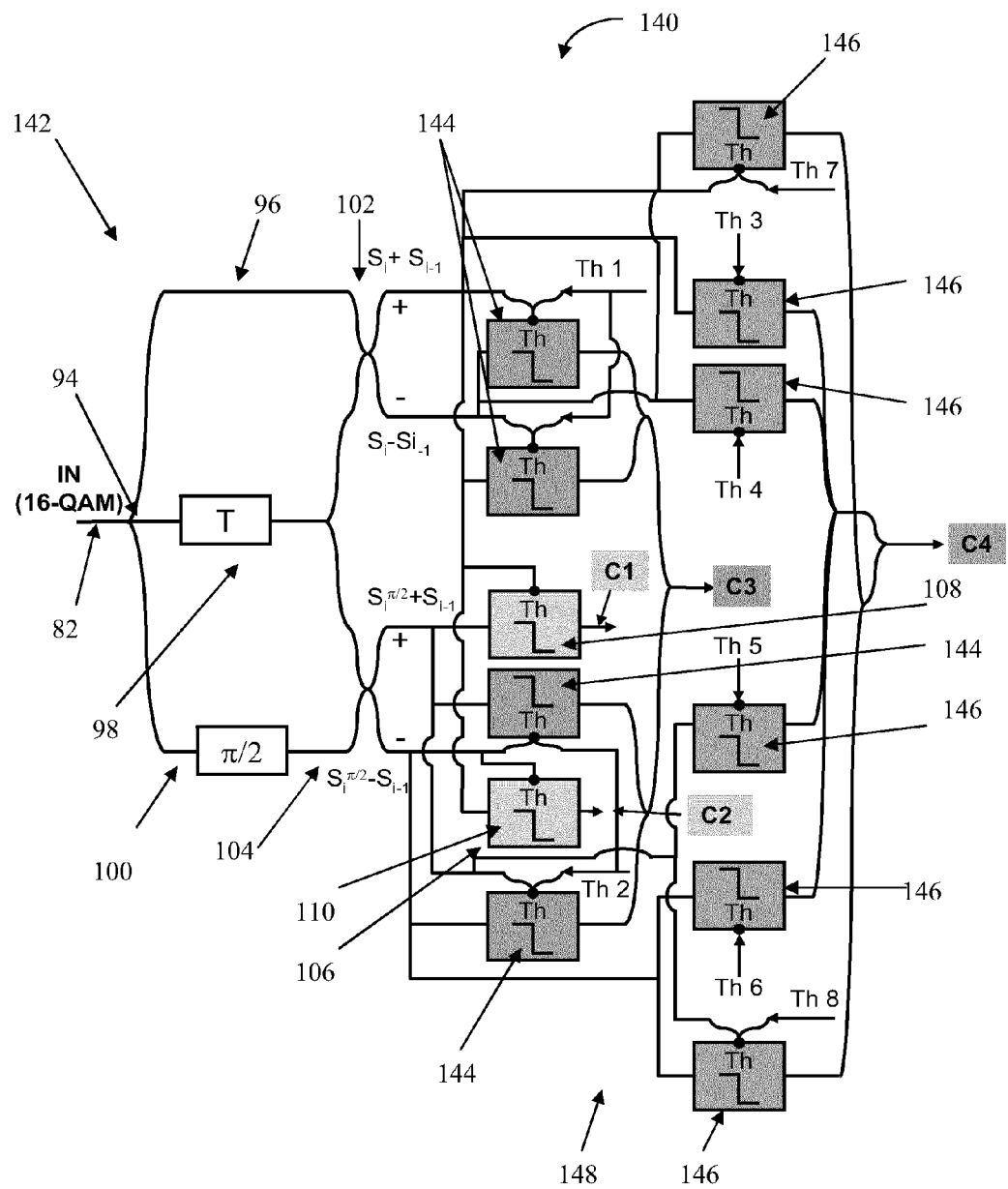
FIG. 17 shows a schematic representation of an optical receiver according to a twelfth embodiment of the invention.

An optical receiver 140 according to a twelfth embodiment of the invention is shown in FIG. 17. The optical receiver 140 of this embodiment is similar to the optical receiver 90 of FIG. 14 with the following modifications. The same reference numbers are retained for corresponding features.

In this embodiment, the optical circuit 142 comprises optical binary signal generation apparatus having a first generation stage 106 and a second generation stage 148.

The second generation stage 148 (that is to say, the first subsequent generation stage) comprises first 144 and second 146 subsequent optical signal comparators. The first subsequent optical signal comparator 146 is arranged to determine whether it is true or false that an amplitude of one of the signal combinations is greater than one of a threshold value and a combination an amplitude of another one of the signal combinations and a threshold value. The first subsequent signal comparator 146 is arranged to generate a first subsequent optical binary signal 86 having a binary signal level of one if it is true and a binary signal level of zero if it is false.

Figure 19:
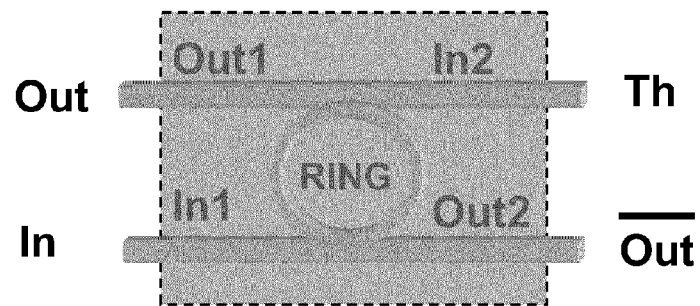
FIG. 19 shows a schematic representation of an optical thresholder for use in the optical receiver of FIG. 17.

In this example, the first subsequent optical signal comparator is formed of four amplitude sensitive optical thresholders 144, in the form of semiconductor micro-ring resonators, as shown in FIG. 19. The thresholders 144 are arranged to receive the signal combinations $S_i+S_{i-1}$, $S_i-S_{i-1}$, $S_i^{\pi/2}+S_{i-1}$ and $S_i^{\pi/2}-S_{i-1}$, and are arranged to perform a third comparison, C3:

$$\{|S_i-S_{i-1}|>?|S_i+S_{i-1}|+Th1\} \text{ or } \{|S_i+S_{i-1}|>?|S_i-S_{i-1}|+Th1\} \text{ or } \{|S_i^{\pi/2}+S_{i-1}|>?\{|S_i^{\pi/2}-S_{i-1}|+Th2\} \text{ or } \{|S_i^{\pi/2}-S_{i-1}|>?\{|S_i^{\pi/2}+S_{i-1}|+Th2\}$$

where $Th1=K1+A+B$ $Th2=K1+A+C$ are threshold values, and where

A is: true or false?$|S_{i-1}|>?K3$

B is: true or false?C1 XOR C2

C is: true or false?C1 EQ C2 and K1, K2 and K3 are constants. K1 is the minimum value of $|S_i-S_{i-1}|+|S_i+S_{i-1}|/2$, K2 is the average of the two lowest values of $|S_i-S_{i-1}|$, and K3=$(|P_{11}|+|P_{16}|)/2$, where $|P_{11}|$ is the amplitude of a first point having π/2 phase in the first quadrant of the constellation diagram of the 16-QAM signal and $|P_{16}|$ is the amplitude of a second point having π/2 phase in the first quadrant of the 16-QAM signal constellation diagram.

FIG. 18(b) shows an optical sub-circuit arranged to perform the logic operation "is it true or false that $|\text{In}|>K$", which is used to obtain A. FIG. 18(a) shows an optical sub-circuit arranged to perform the logic operation "is it true or false that In1 XOR In2", which is used to obtain B, and to perform the logic operation "is it true or false that In1 EQ In2", which is used to obtain C. Kt is the average between the "1" and "0" signal levels.

If C3 is true, a third OOK signal is generated with a binary signal level "1". If C3 is false, a third OOK signal is generated with a binary signal level "0".

The second subsequent optical signal comparator 146 is arranged to determine whether it is true or false that an amplitude of one of the signal combinations is greater than one of a further threshold value and a combination an amplitude of another one of the signal combinations and a further threshold value. The second subsequent optical signal comparator 146 is arranged to generate a second subsequent optical binary signal having a binary signal level of one if it is true and a binary signal level of zero if it is false.

The second subsequent optical signal comparator is formed of six amplitude sensitive optical thresholders 146, in the form of semiconductor micro-ring resonators. The thresholders 146 are arranged to receive the signal combinations $S_i+S_{i-1}$, $S_i-S_{i-1}$, $S_i^{\pi/2}+S_{i-1}$ and $S_i^{\pi/2}-S_{i-1}$, and are arranged to perform a fourth comparison, C4:

$$\{|S_i+S_{i-1}|>?Th3\} \text{ or } \{|S_i-S_{i-1}|>?Th4\} \text{ or } \{|S_i^{\pi/2}+S_{i-1}|>?Th5\} \text{ or } \{|S_i^{\pi/2}+S_{i-1}|>?Th5\} \text{ or } \{|S_i-S_{i-1}|>?|S_i+S_{i-1}|+Th7\} \text{ or } \{|S_i^{\pi/2}-S_{i-1}|>?\{|S_i^{\pi/2}+S_{i-1}|+Th8\}$$

where $Th3=K2+C+C2+C3$ $Th4=K2+C+NOT(C2)+C3$ $Th5=K2+B+C2+C3$ $Th6=K2+B+NOT(C2)+C3$ $Th7=B+NOT(C3)$ $Th8=C+NOT(C3)$ are threshold values, C2 is the output of the second comparison and C3 is the output of the third comparison.

FIG. 18(c) shows an optical sub-circuit arranged to perform the logic operation "NOT(in)", which is used to obtain threshold values Th4, Th6, Th7 and Th8.

Figure 20:
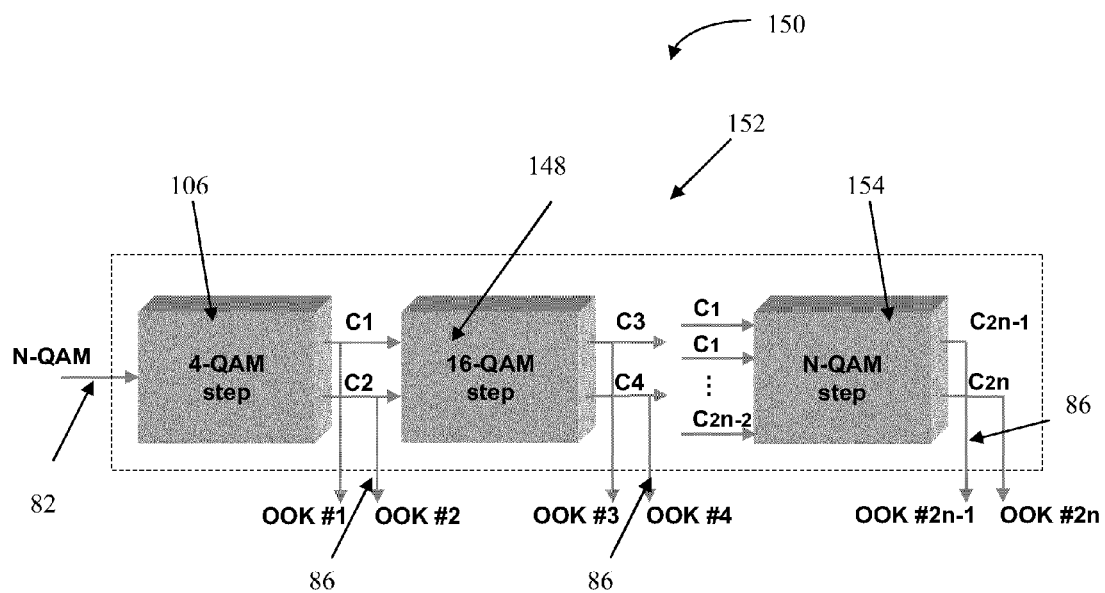
FIG. 20 shows a schematic representation of an optical receiver according to a thirteenth embodiment of the invention.

An optical receiver 150 according to a thirteenth embodiment of the invention is shown in FIG. 20. The optical receiver 150 of this embodiment is similar to the optical receiver 140 of FIG. 17 with the following modifications. The same reference numbers are retained for corresponding features.

In this embodiment, the optical circuit 152 comprises optical binary signal generation apparatus having a first generation stage 106, a second generation stage 148 and n−1 subsequent generation stages 154, each arranged to generate two OOK signals 86.

Figure 21:
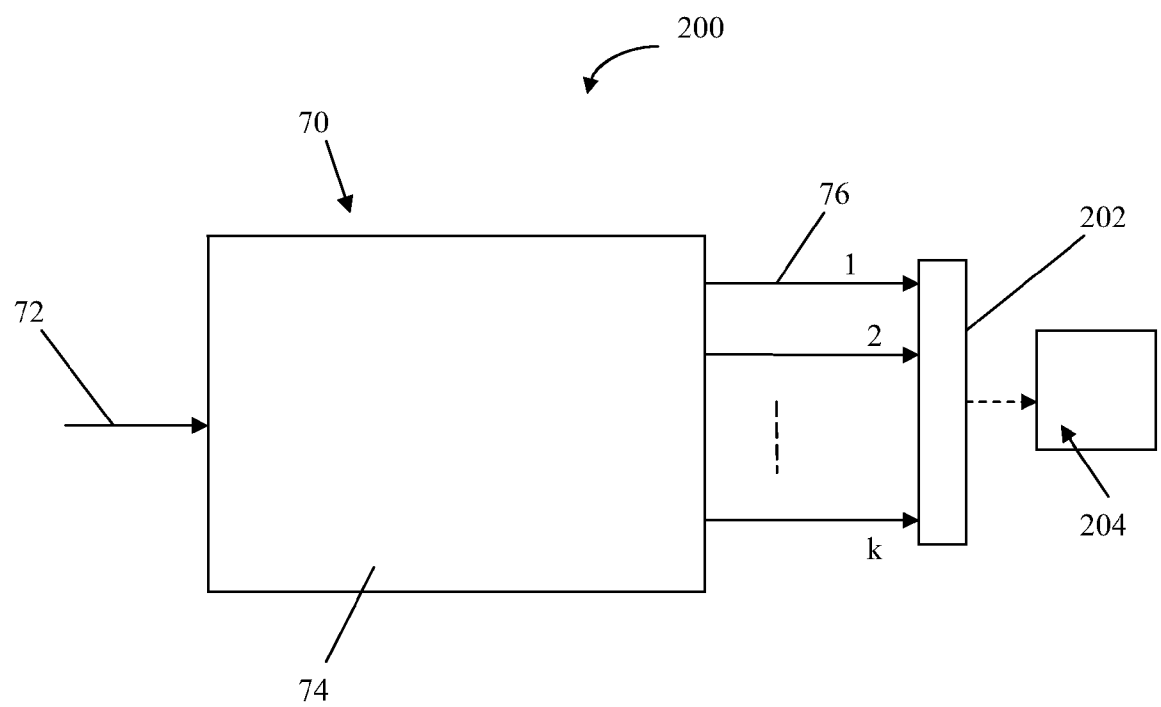
FIG. 21 shows a schematic representation of an optical receiver according to a fourteenth embodiment of the invention.
Figure 22:
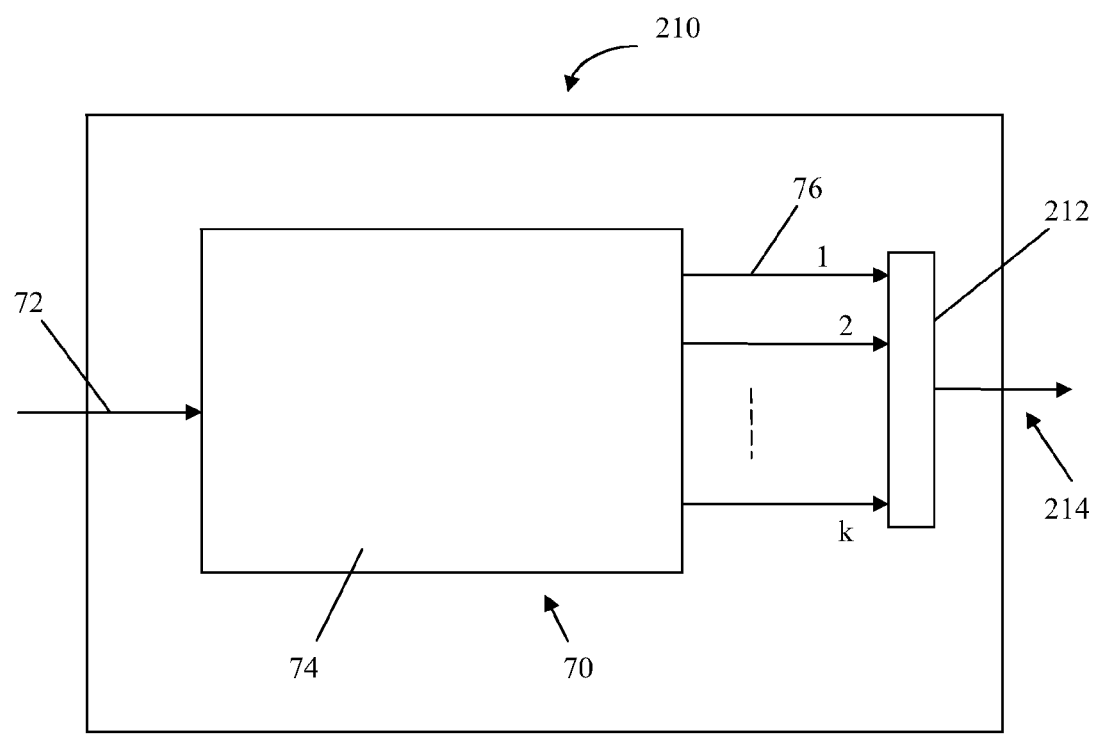
FIG. 22 shows a schematic representation of an optical regenerator according to a fifteenth embodiment of the invention.

An optical receiver 200 according to a fourteenth embodiment of the invention is shown in FIG. 21. The optical receiver 200 of this embodiment is similar to the optical receiver 70 of FIG. 12 with the following modifications. The same reference numbers are retained for corresponding features.

In this embodiment, the optical receiver 200 further comprises optical detection apparatus 202 and a controller 204. The optical detection apparatus 202 is arranged to determine the respective binary signal level of each optical binary signal 76. The controller 204 is arranged to obtain a phase change between the symbol signals in dependence on the optical binary signal levels.

An optical signal regenerator 210 according to a fifteenth embodiment of the invention is shown in FIG. 21.

The optical signal regenerator 210 comprises an optical receiver 70, an optical combiner 212 and an optical output 214.

The optical receiver 70 is as shown in FIG. 12. It will be appreciated however that any of the optical receivers 80, 90, 120, 130, 140, 150 of FIGS. 13 to 20 may alternatively be used.

The optical combiner 212 is arranged to receive the optical binary signals and to combine the optical binary signals into an output optical signal. The optical output 214 is arranged to output the optical signal.

A sixteenth embodiment of the invention provides an optical data carrier having computer readable instructions embodied therein. The computer readable instructions are for providing access to resources available on a processor. The computer readable instructions comprise instructions to cause the processor to perform any of the steps of the method 10 of converting an optical communications signal having a differentially encoded multilevel modulation format into communications traffic bits.

The invention claimed is:

1. A method of converting an optical communications signal having a differentially encoded multilevel modulation format into communications traffic bits, the multilevel modulation format having a plurality of constellation points, the method comprising:
   receiving a consecutive pair of symbol signals of said optical communications signal, the pair of symbol signals being arranged to differentially encode a plurality of communications traffic bits; and
   generating a plurality of optical binary signals in dependence on the symbol signals, each optical binary signal having a respective binary signal level, wherein the optical binary signals form optical versions of the encoded communications traffic bits, wherein the generating the plurality of optical binary signals comprises:
      receiving a first symbol signal, $S_{i-1}$, of the pair of symbol signals and receiving a second symbol signal, $S_i$, of the pair of symbol signals;
      forming a phase-rotated version of the second symbol signal, $S_i^{\pi/2}$, having a $\pi/2$ phase difference relative to the second symbol signal, $S_i$;
      forming each of the following signal combinations:

$S_i + S_{i-1}$;

$S_i - S_{i-1}$;

$S_i^{\pi/2} + S_{i-1}$; and $S_i^{\pi/2} - S_{i-1}$; and generating a plurality of optical binary signals in a number, n, of generation steps, where the number of constellation point is $2^{2n}$, each generation step being operative to generate two said optical binary signals in dependence on said signal combinations.

2. The method as claimed in claim 1, wherein the generating a plurality of optical binary signals comprises a first generation step comprising:
   determining whether an amplitude of a first one of the signal combinations is greater than an amplitude of a second one of the signal combinations;
   responsive to determining that the amplitude of the first one of the signal combinations is greater, generating a first said optical binary signal having a binary signal level of one;
   responsive to determining that the amplitude of the first one of the signal combinations is not greater, generating the first said optical binary signal having a binary signal level of zero; and
   determining whether an amplitude of a third one of the signal combinations is greater than an amplitude of a fourth one of the signal combinations;
   responsive to determining that the amplitude of the third one of the signal combinations is greater, generating a second said optical binary signal having a binary signal level of one; and
   responsive to determining that the amplitude of the third one of the signal combinations is not greater, generating the second said optical binary signal having a binary signal level of zero.

3. The method as claimed in claim 2, wherein:
   determining whether the amplitude of the first one of the signal combinations is greater than the amplitude of the second one of the signal combinations is based on the result of evaluating one of the following Boolean expressions:

$|S_i + S_{i-1}| > |S_i^{\pi/2} + S_{i-1}|$;

$|S_i - S_{i-1}| > |S_i^{\pi/2} - S_{i-1}|$;

$|S_i^{\pi/2} + S_{i-1}| > |S_i + S_{i-1}|$; and $|S_i^{\pi/2} - S_{i-1}| > |S_i - S_{i-1}|$; and determining whether the amplitude of the third one of the signal combinations is greater than the amplitude of the fourth one of the signal combinations is based on the result of evaluation one of the following Boolean expressions:

$|S_i + S_{i-1}| > |S_i^{\pi/2} - S_{i-1}|$;

$|S_i - S_{i-1}| > |S_i^{\pi/2} + S_{i-1}|$;

$|S_i^{\pi/2} + S_{i-1}| > |S_i - S_{i-1}|$; and $|S_i^{\pi/2} - S_{i-1}| > |S_i + S_{i-1}|$.

4. The method as claimed in claim 3, wherein the generating a plurality of optical binary signals further comprises at least one subsequent generation step, each subsequent generation step comprising:
- a first logic operation comprising determining whether an amplitude of one of the signal combinations is greater as compared to one of a:
  - threshold value; and
  - a combination of an amplitude of another one of the signal combinations and a threshold value;
- responsive to determining that the amplitude of one of the signal combinations is greater, generating a first subsequent optical binary signal having a binary signal level of one;
- responsive to determining that the amplitude of one of the signal combinations is not greater, generating the first subsequent optical binary signal having a binary signal level of zero; and
- a second logic operation comprising determining whether an amplitude of one of the signal combinations is greater than one of:
  - a further threshold value; and
  - a combination of an amplitude of another one of the signal combinations and a further threshold value;
- responsive to determining that the amplitude of one of the signal combinations is greater, generating a second subsequent optical binary signal having a binary signal level of one;
- responsive to determining that the amplitude of one of the signal combinations is not greater, generating a second subsequent optical binary signal having a binary signal level of zero.

5. The method of claim 1, wherein the number of optical binary signals is a logarithmic base 2 function of the number of constellation points.

6. An optical receiver comprising:
- an input operative to receive an optical communications signal having a differentially encoded multilevel modulation format having a plurality of constellation points; and
- an optical circuit operative to receive a consecutive pair of symbol signals of said optical communications signal, the pair of symbol signals being arranged to differentially encode a plurality of communications traffic bits, and the optical circuit being operative to generate a plurality of optical binary signals in dependence on the symbol signals, each optical binary signal having a respective binary signal level, wherein the optical binary signals form optical versions of the encoded communications traffic bits, wherein the optical circuit comprises:
  - an optical splitter operative to receive each symbol signal and to power split each symbol signal into a first part, a second part and a third part;
  - a first optical path operative to transmit the first part to form an unmodified symbol signal, $S_i$;
  - a second optical path operative to apply a time delay to the second part, the time delay being the symbol time of the optical communications signal, to form a delayed symbol signal, $S_{i-1}$, and the second optical path operative to power split the delayed symbol signal into a first part and a second part;
  - a third optical path operative to apply a $\pi/2$ phase shift to the third part to form a phase rotated symbol signal, $S_i^{\pi/2}$;
  - a first signal combiner operative to receive the unmodified symbol signal and a first part of the delayed symbol signal, and operative to form the signal combinations $S_i+S_{i-1}$ and $S_i-S_{i-1}$;
  - a second signal combiner operative to receive the second part of the delayed symbol signal and the phase rotated symbol signal, and operative to form the signal combinations $S_i^{\pi/2}+S_{i-1}$, and $S_i^{\pi/2}-S_{i-1}$; and
  - an optical binary signal generation apparatus comprising a number of generation stages, where the number of constellation points is $2^{2n}$, each generation stage being operative to generate two said optical binary signals in dependence on said signal combinations.

7. The optical receiver as claimed in claim 6, wherein a first said generation stage comprises:
- a first optical signal comparator operative to generate a first said optical binary signal having a binary signal level of one if an amplitude of a first one of the signal combinations is greater than an amplitude of a second one of the signal combinations, and operative to generate a first said optical binary signal having a binary signal level of zero if the amplitude of said first signal combination is not greater than the amplitude of said second signal combination; and
- a second optical signal comparator operative to generate a second said optical binary signal having a binary signal level of one if an amplitude of a third one of the signal combinations is greater than an amplitude of a fourth one of the signal combinations, and operative to generate a second said optical binary signal having a binary signal level of zero if the amplitude of said third signal combination is not greater than the amplitude of said fourth signal combination.

8. The optical receiver as claimed in claim 7, wherein:
the first optical signal comparator is operative to evaluate one of the following Boolean expressions:

$|S_i+S_{i-1}|>|S_i^{\pi/2}+S_{i-1}|;$ $|S_i-S_{i-1}|>|S_i^{\pi/2}-S_{i-1}|;$ $|S_i^{\pi/2}+S_{i-1}|>|S_i+S_{i-1}|;$ and $|S_i^{\pi/2}-S_{i-1}|>|S_i-S_{i-1}|;$ the first optical signal comparator is operative to generate a first said optical binary signal having a binary signal level of one if said Boolean expression evaluates to true and to generate a first said optical binary signal having a binary signal level of zero if said Boolean expression evaluates to false;
the second optical signal comparator is operative to evaluate one of the following Boolean expressions:

$|S_i+S_{i-1}|>|S_i^{\pi/2}-S_{i-1}|;$ $|S_i-S_{i-1}|>|S_i^{\pi/2}+S_{i-1}|;$ $-|S_i^{\pi/2}+S_{i-1}|>|S_i-S_{i-1}|;$ and $|S_i^{\pi/2}-S_{i-1}|>|S_i+S_{i-1}|;$ the second optical signal comparator is operative to generate a second said optical binary signal having a binary signal level of one if said one of the Boolean expressions evaluates to true and to generate a second said optical binary signal having a binary signal level of zero if said Boolean expression evaluates to false.

9. The optical receiver as claimed in claim 6, wherein the optical binary signal generation apparatus comprises the first said generation stage and at least one subsequent said generation stage, each subsequent generation stage comprising:

a first subsequent optical signal comparator operative to:
  determine whether an amplitude of one of the signal combinations is greater than one of a threshold value and a combination an amplitude of another one of the signal combinations and a threshold value;
  responsive to a determination that the amplitude of one of the signal combinations is greater, generate a first subsequent optical binary signal having a binary signal level of one; and
  responsive to a determination that the amplitude of one of the signal combinations is not greater, generate the first subsequent optical binary signal having a binary signal level of zero;
a second subsequent optical signal comparator operative to:
  determine whether an amplitude of one of the signal combinations is greater than one of a further threshold value and a combination an amplitude of another one of the signal combinations and a further threshold value;
  responsive to a determination that the amplitude of one of the signal combinations is greater, generate a second subsequent optical binary signal having a binary signal level of one; and
  responsive to a determination that the amplitude of one of the signal combinations is not greater, generate a second subsequent optical binary signal having a binary signal level of zero.

10. The optical receiver as claimed in claim 7, wherein each optical signal comparator comprises an optical thresholder.

11. The optical receiver of claim 6, wherein the number of optical binary signals is a logarithmic base 2 function of the number of constellation points.

12. An optical signal regenerator comprising:
  an optical receiver including:
    an input operative to receive an optical communications signal having a differentially encoded multilevel modulation format having a plurality of constellation points, and
    an optical circuit operative to receive a consecutive pair of symbol signals of said optical communications signal, the pair of symbol signals being arranged to differentially encode a plurality of communications traffic bits, and the optical circuit being operative to generate a plurality of optical binary signals in dependence on the symbol signals, each optical binary signal having a respective binary signal level, wherein the optical binary signals form optical versions of the encoded communications traffic bits, wherein the optical circuit comprises:
      an optical splitter operative to receive each symbol signal and to power split each symbol signal into a first part, a second part and a third part,
      a first optical path operative to transmit the first part to form an unmodified symbol signal, $S_i$,
      a second optical path operative to apply a time delay to the second part, the time delay being the symbol time of the optical communications signal, to form a delayed symbol signal, $S_{i-1}$, and the second optical path operative to power split the delayed symbol signal into a first part and a second part,
      a third optical path operative to apply a $\pi/2$ phase shift to the third part to form a phase rotated symbol signal, $S_i^{\pi/2}$,
      a first signal combiner operative to receive the unmodified symbol signal and a first part of the delayed symbol signal, and operative to form the signal combinations $S_i+S_{i-1}$ and $S_i-S_{i-1}$,
      a second signal combiner operative to receive the second part of the delayed symbol signal and the phase rotated symbol signal, and operative to form the signal combinations $S_i^{\pi/2}+S_{i-1}$ and $S_i^{\pi/2}-S_{i-1}$, and
      an optical binary signal generation apparatus comprising a number of generation stages, where the number of constellation points is $2^{2n}$, each generation stage being operative to generate two said optical binary signals in dependence on said signal combinations.

* * * * *